United States Patent
Sumioka et al.

(10) Patent No.: US 7,738,338 B2
(45) Date of Patent: Jun. 15, 2010

(54) OPTICAL INFORMATION REPRODUCING METHOD

(75) Inventors: Jun Sumioka, Kawasaki (JP);
Masakuni Yamamoto, Yamato (JP);
Kaoru Okamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 11/765,058

(22) Filed: Jun. 19, 2007

(65) Prior Publication Data

US 2008/0013439 A1    Jan. 17, 2008

(30) Foreign Application Priority Data

Jul. 12, 2006    (JP) ............................. 2006-191572
Apr. 16, 2007    (JP) ............................. 2007-107045

(51) Int. Cl.
*G11B 5/09*    (2006.01)
*G11B 7/00*    (2006.01)

(52) U.S. Cl. ................ 369/59.2; 369/59.19; 369/275.4; 369/59.17

(58) Field of Classification Search ................ 369/59.2, 369/59.19
See application file for complete search history.

(56) References Cited

U.S. PATENT DOCUMENTS

| | | | |
|---|---|---|---|
| 5,555,231 A | 9/1996 | Yamamoto | |
| 7,065,028 B2 * | 6/2006 | Schoene et al. | 369/59.19 |
| 2003/0210634 A1 * | 11/2003 | Shimizu | 369/59.12 |
| 2003/0223341 A1 * | 12/2003 | Minagawa | 369/59.22 |
| 2005/0270959 A1 * | 12/2005 | Iwasa et al. | 369/116 |
| 2006/0280069 A1 | 12/2006 | Yamamoto et al. | 369/47.1 |
| 2007/0025217 A1 | 2/2007 | Miyaoka et al. | 369/53.34 |
| 2007/0091759 A1 | 4/2007 | Yamamoto et al. | 369/59.11 |
| 2007/0171800 A1 | 7/2007 | Okamoto et al. | 369/59.1 |
| 2007/0177478 A1 | 8/2007 | Sumioka et al. | 369/59.15 |

FOREIGN PATENT DOCUMENTS

JP    05-128530    5/1993

OTHER PUBLICATIONS

Noburu Sasa et al., "Write-Once Disks for Multi-level Optical Recording", Proceedings of the International Symposium on Optical Memory, 2003.

* cited by examiner

*Primary Examiner*—Peter Vincent Agustin
*Assistant Examiner*—Emily Frank
(74) *Attorney, Agent, or Firm*—Fitzpatrick, Cella, Harper & Scinto

(57) ABSTRACT

An optical information reproducing method of reproducing multivalued information recorded on a track of an optical information medium having a recording/reproducing region, which has virtual cells arranged thereon at regular spacings. The multivalued information is recorded thereon by changing a length of an information pit in a track direction or an area of the information pit in a cell with the use of a light spot. The multivalued information is reproduced by detecting the level of a multistage reproduced signal from the information pit. The method includes sampling a reproduced signal in the multivalued information recorded in one cell with an M-value (M<N), which is arranged at each of the plurality of cells recorded with an N-value (N≧3) on the track, and detecting a cell center value. A phase error for producing a reproduction clock is obtained on the basis of the detected cell center value, a previously derived ideal value of the cell center value, and a previously derived gradient of the reproduced signal in the vicinity of the ideal value of the cell center value.

2 Claims, 15 Drawing Sheets

REGION (CELL) FOR RECORDING ONE INFORMATION PIT

OPTICAL INFORMATION REPRODUCING METHOD

This application claims the benefit of Japanese Patent Application No. 2006-191572, filed Jul. 12, 2006, and No. 2007-107045, filed Apr. 16, 2007, which are hereby incorporated by reference herein in their entirety.

BACKGROUND OF THE INVENTION

1. Field of the Invention

The present invention relates to an optical information reproducing method which reproduces multivalued information by using three or more values, and, particularly, relates to a method for detecting phase error information for a PLL (phase-locked loop), which produces a reproduction clock to be used when recorded information is reproduced.

2. Description of the Related Art

In recent years, an optical memory industry has been expanded. Various optical memory media have been developed, such as a reproduction-only CDs and DVDs, a write-once type recording medium using a metallic film and a pigment-based recording material, and further, a rewritable type recording medium using a photomagnetic material and a phase-changeable material. The application also has been widened from consumer products to an external memory of a computer.

Furthermore, research and development have proceeded on the identification for a recording capacity of the recording medium. One technology for minimizing a light spot related to the recording and reproduction of information is to change a wavelength of a light source from red (650 nm) to blue-violet (405 nm). Another technology is to change a numerical aperture of an objective lens from 0.6 or 0.65 to 0.85. On the other hand, a technology has been proposed which more efficiently records and reproduces information while using the same size of a light spot, but one having a multi-value.

For instance, a method is proposed in Japanese Patent Application Laid-Open No. H05-128530, as a method of a multi-value recording and reproducing technology. The above Japanese patent publication discloses a method of recording multivalued information on an information track of an optical information recording medium by combining a length of an information pit in a track direction with a shift amount for a light spot for reproducing the information pit in the track direction. This Japanese patent publication also discloses a method of reproducing the multivalued information pit by using the correlation between a previously-learned detecting signal and a detecting signal provided from the light spot, when reproducing the multivalued-recorded information pit.

In addition, in ISOM (International Symposium on Optical Memory) 2003 (Write-once Disks for Multi-level Optical Recording: proceedings Fr-Po-), which is an international institute in a research field of an optical disk, the following technology is presented. Specifically, the technology records and reproduces eight-level multi-value information onto and from an optical disk while using a light source of blue-violet (405 nm), an optical system having an NA of 0.65, an optical disk with a track pitch of 0.46 μm, and a region for recording one information pit (hereafter, referred to as a cell), which is virtually arranged and has a width of 0.26 μm in a track direction.

In order to select an eight-level information pit, for instance, a length of a cell in a track direction (direction (A) in the figure) is divided into sixteen equal parts, as shown in FIG. 20; and a level 0 is set for no recorded information pit, level 1 is set at a width corresponding to a $2/16$ cell, level 2 at a width corresponding to the $4/16$ cell, level 3 at a width corresponding to the $6/16$ cell, level 4 at a width corresponding to the $8/16$ cell, level 5 at a width corresponding to the $10/16$ cell, level 6 at a width corresponding to the $12/16$ cell, and level 7 at a width corresponding to the $14/16$ cell.

The thus selected information pit is recorded on a track at random, and a photodetector receives light reflected from the pit, and detects the light amount. Suppose that a reproduced signal is sampled from the obtained multivalued information pit when a center of a light spot comes to the center of a cell in a track direction. Then, amplitude of the reproduced signal at each level shows such a distribution as shown in FIG. 21.

The technology also employs a configuration in which a clock for sampling information detects phase error information by reproducing a predetermined pit row inserted at predetermined intervals while the information has been recording, in the above step, and produces the phase error information in a phase-locked loop circuit (PLL circuit).

FIG. 22 illustrates an example which has a pit row for detecting a phase error inserted between other rows. In the figure, reference characters (A) to (I) denote recorded information rows, and reference character (A) denotes the pit row for PLL lock-in, which is positioned at the head of recorded data. The pit row for PLL lock-in is adopted, in many cases, no matter what the multivalued recording is. Reference character (B) denotes a learning pit row for obtaining a reproduced signal of the known pit row.

Reference characters (C), (E), (G) and (I) denote encoded user information. Reference characters (D), (F) and (H) denote pit rows for detecting a phase error for a PLL, which produces a reproduction clock. For instance, an edge is extracted through a digitalization process with the use of a level-slicing technique. Then, a phase comparator detects information on the phase error between the edge and the reproduction clock. The phase error information is used for the PLL processing of the reproduction clock. In multivalued recording, edges periodically appear regardless of a recorded pit size. Accordingly, in order to obtain phase information with a high signal-to-noise ratio, it is desirable to control the pit row for detecting the phase error, so that the minimum level and the maximum level can alternately appear.

Let us return to the description in FIG. 21. When a state of level 0 having no information recorded in a pit continues, the reproduced signal level is standardized to be "1", and when the information of level 7 is continuously recorded in pits, the reproduced signal level is standardized to be "0".

The value of the reproduced signal corresponding to each level has an amplitude, because the value is affected (intersymbol interference) by information written in the pits in front and back of the noted information pit. As is shown in FIG. 21, when an amplitude distribution of a reproduced signal in a certain level overlaps with that in the next level, the reproduced signal cannot be separated/detected by using a fixed threshold value.

A method for solving the problem is disclosed in ISOM 2003 (Write-once Disks for Multi-level Optical Recording: proceedings Fr-Po-04). The separating/detecting method specifically includes making the optical recording system carry out: reading a reproduced signal from a pit row containing a previously known value in a noted information pit and a value in information pits in front and back, memorizing it (learning), and comparing the reproduced signal obtained from the real information pit with a recorded value (recognition of correlation). The method provides a recording density of about 16 Gbit/inch$^2$.

When the above-described method for recording and reproducing the information of a multivalued level aims to obtain a phase error signal at a sufficient precision in order to produce a reproduction clock for detecting the reproduced signal level, the method shows the following problems that the method needs to insert a sufficiently large pit row with a predetermined length at a predetermined spacing, so as to be capable of detecting the phase information which has been digitized by using a fixed slicing technique.

The inserted pit row for detecting the phase error then lowers the information efficiency of a recording format in an information recording medium, and hinders row density in multivalued recording from being improved.

SUMMARY OF THE INVENTION

The present invention provides an optical information reproducing method including arranging one cell having information recorded by an M-value (M<N), at each of a plurality of cells having information recorded by an N-value (N≧3) on a track of an optical information medium, sampling a reproduced signal in the cell recorded by the M-value, detecting a cell center value of the reproduced signal, and obtaining a phase error for producing a reproduction clock on the basis of the detected cell center value, a previously derived ideal value of a cell center value, and a previously derived gradient of the reproduced signal in the vicinity of the ideal value of the cell center value.

The present invention also provides another optical information reproducing method including arranging continuously two cells having information recorded by an M-value (M<N), at each of a plurality of cells having information recorded by an N-value pit (N≧3) on a track of an optical information medium, sampling reproduced signals recorded by the M-value in the continuous two cells, detecting the intercell value between the reproduced signals, and obtaining a phase error for producing a reproduction clock on the basis of the detected intercell value, a previously derived ideal value of an intercell value, and a previously derived gradient of the reproduced signal in the vicinity of the ideal value of the intercell value.

The present information further provides another optical information reproducing method including arranging continuously three cells having information recorded by an M-value (M<N), at each of the plurality of cells having information recorded by an N-value pit (N≧3) on a track of an optical information medium, sampling reproduced signals recorded by the M-value in the continuous three cells, detecting the cell center value of the central cell among the continuous three cells recorded by the M-value, and obtaining a phase error for producing a reproduction clock on the basis of the detected cell center value, a previously derived ideal value of a cell center value, and a previously derived gradient of the reproduced signal in the vicinity of the ideal value of the cell center value.

The present invention provides still another optical information reproducing method including arranging one cell having information recorded by an M-value (M<N), at each of the plurality of cells having information recorded by an N-value (N≧3) on a track of an optical information medium, detecting the timing of sampling of the cell center value of a reproduced signal in the cell recorded by the M-value, detecting the timing when the reproduced signal comes to a previously derived ideal value of a cell center value, and obtaining a phase error for producing a reproduction clock on the basis of a difference between the timing of sampling the cell center value of the detected reproduced signal and the timing when the reproduced signal comes to the ideal value of the cell center value.

Further features of the present invention will become apparent from the following description of exemplary embodiments with reference to the attached drawings.

DESCRIPTION OF THE EMBODIMENTS

Figure 1:
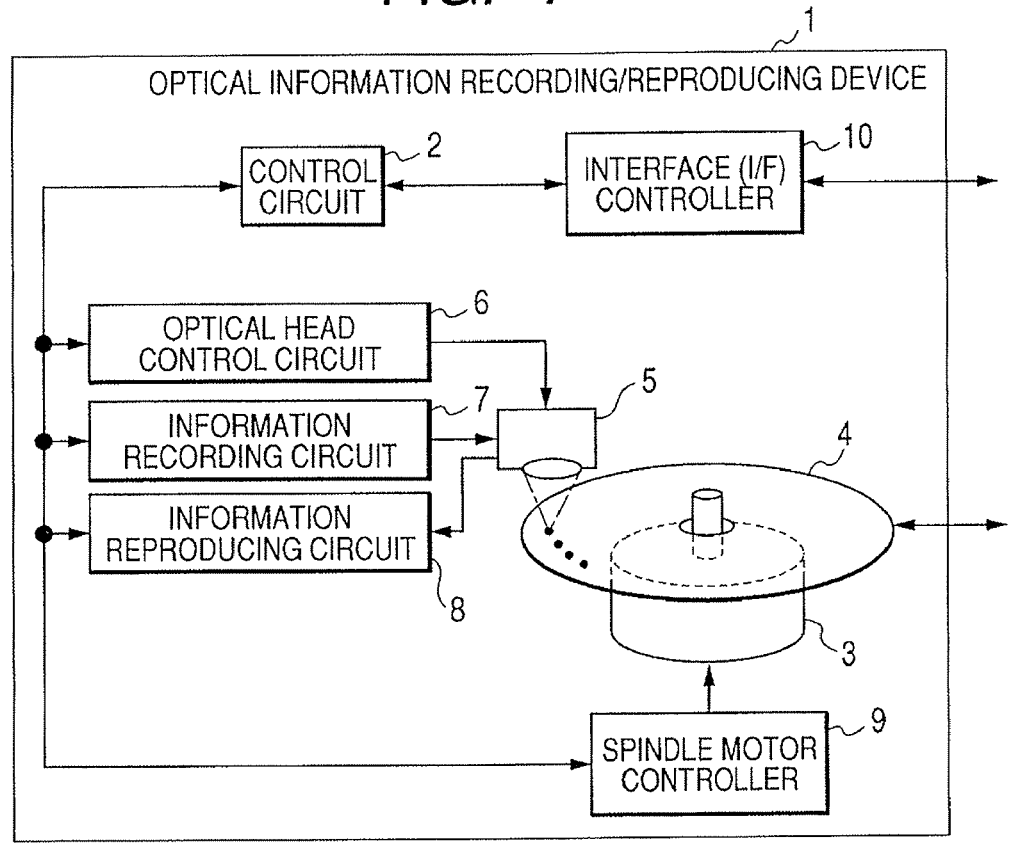
FIG. 1 is a block diagram illustrating one embodiment of an optical information recording/reproducing device according to the present invention.

Next, the best mode for carrying out the invention will be described in detail with reference to the drawings. FIG. 1 is a block diagram illustrating one embodiment of an optical information recording/reproducing device according to the present invention. In FIG. 1, an optical information recording/reproducing device 1 has a control circuit 2, a spindle motor 3, an optical disk 4, an optical head 5, an optical head control circuit 6, an information recording circuit 7, an information reproducing circuit 8, a spindle motor controller 9, and an interface (I/F) controller 10.

A control circuit 2 controls transmission and reception of information to or from an external information processing apparatus, such as a computer, and also, controls recording information on and reproducing information from an optical disk 4 through an information recording circuit 7 and an information reproducing circuit 8, and other working units. Information recording circuit 7 records multivalued information, and information reproducing circuit 8 reproduces the multivalued information, which will be described later.

A spindle motor 3 is controlled by a spindle motor controller 9 and rotates an optical disk 4. An optical disk 4 is an optical information recording medium, which can be mounted onto and demounted from an optical information recording/reproducing device 1, by a mechanism, which is not shown.

An optical head 5 optically records information on and reproduces information from an optical disk 4. An optical head 5 emits a light spot having a size of 0.405 µm, for instance, when a light source employs a wavelength of 405 nm and an objective lens employs a numerical aperture of 0.85. The optical disk 4 has a track pitch of 0.32 µm. An optical head control circuit 6 controls the position of the spot of light projected from the optical head 5, and controls automatic tracking, a seeking operation and automatic focusing.

A phase error signal to be used when information is reproduced according to the present invention is produced in an information reproducing circuit 8. The information reproducing circuit 8 detects a cell center value and an intercell value, which will be described later, calculates a reproduced signal gradient, and calculates a phase error.

Figure 2:
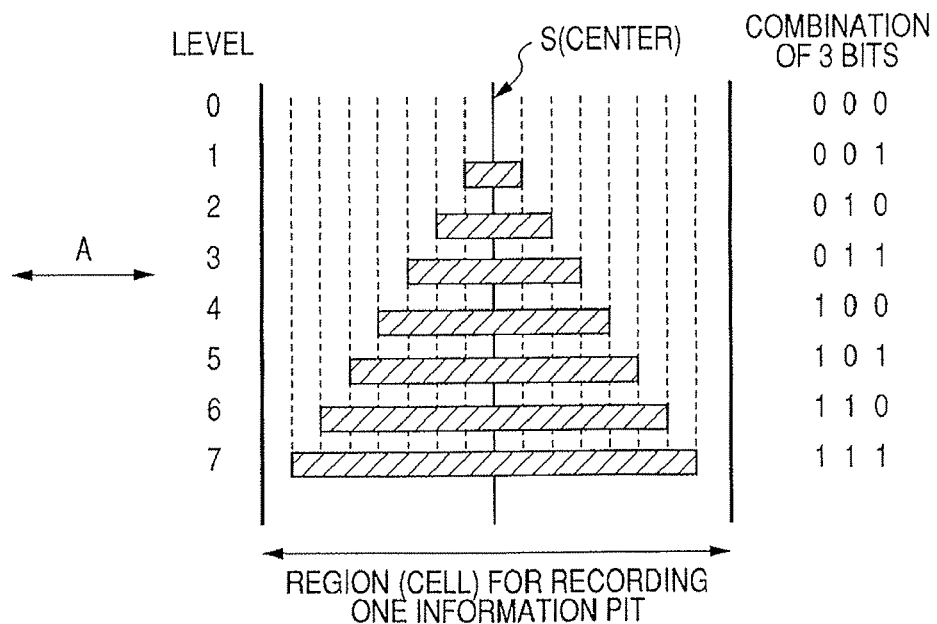
FIG. 2 is a view for describing a width of a multivalued information pit recorded by an eight-value in a track direction according to a difference of levels, and a combination of three bits corresponding to the width, according to the present invention.

At first, a multivalued information recording/reproducing method according to the present invention and a device therefor will be described. FIG. 2 is a view for describing a width of a multivalued information pit recorded by the eight-value of a multivalued degree in a track direction (direction of (A) in the figure) varying in accordance with a difference of levels, which is used for an optical information recording/reproducing device according to the present invention. In FIG. 2, the width of the direction perpendicular to the track direction of the multivalued information pit is shown to be smaller than the real width, for the sake of convenience of description. Hereafter, the multivalued information pit shown in the figure is referred to as an N-value pit.

A configuration employed in the present invention is based on such multivalued information as is used in a cell recorded by using an N-value, and inserts the cell into one part, which is recorded by using an M-value of a decreased multiple value degree. In other words, N and M have a relationship expressed by N>M.

In FIG. 2, a cell is shown by a region sandwiched between two thick continuous lines. In the present embodiment, a size of a light spot is set at 0.405 µm, a track pitch of an optical disk at 0.32 µm, and a width of the cell at 0.2 p.m.

In this case, the width of a minimum information pit (level 1) is 25 nm, and as described hereafter, in order, 50 nm for level 2, 75 nm for level 3, 100 nm for level 4, 125 nm for level 5, 150 nm for level 6, and 175 nm for level 7. Level 0 means that nothing is recorded.

The multivalued information in an N-value pit shall be recorded, for instance, by using an eight-value. In other words, one cell can make three bits recorded therein. For instance, as is shown in FIG. 2, the information of three bits shall be 0 level corresponding to (0, 0, 0), 1 level corresponding to (0, 0, 1), 2 level corresponding to (0, 1, 0), 3 level corresponding to (0, 1, 1), 4 level corresponding to (1, 0, 0), 5 level corresponding to (1, 0, 1), 6 level corresponding to (1, 1, 0), and 7 level corresponding to (1, 1, 1). As a matter of course, another corresponding method may be employed.

Figure 3:
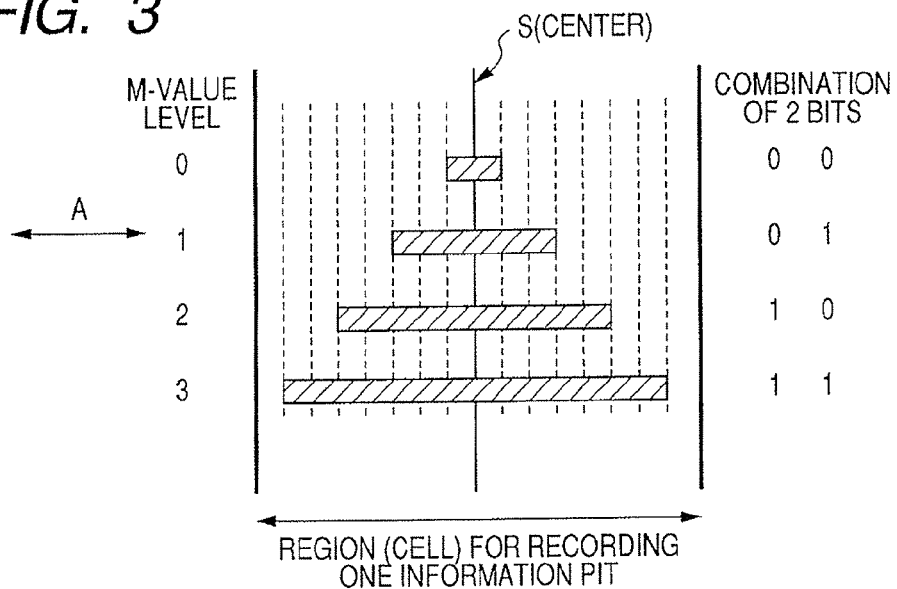
FIG. 3 is a view for describing a width of a multivalued information pit recorded by the four-value of a decreased multivalued degree in a track direction according to a difference of levels, according to the present invention.

FIG. 3 is a view for describing a width of a multivalued information pit recorded by a four-value, namely, M=4 of a decreased multivalued degree in a track direction (direction of (A) in the figure) varying in accordance with a difference of levels, which is used for an optical information recording/reproducing device according to the present invention. Hereafter, the multivalued information pit shown in the figure is referred to as an M-value pit.

In this case, a width of a minimum information pit (level 0) is set at 25 nm, and, as described hereafter, in order, level 1 at 75 nm, level 2 at 125 nm and level 3 at 175 nm. As a matter of course, such a method may be employed so as to set level 0 at a state of recording nothing and increase the width of 50 nm for every one level.

Multivalued information for an M-value pit is recorded by using a four-value, so that two bits can be recorded in one cell. For instance, as is shown in FIG. 3, the information of two bits shall be 0 level corresponding to (0, 0), 1 level corresponding to (0, 1), 2 level corresponding to (1, 0), and 3 level corresponding to (1, 1). As a matter of course, another corresponding method may be employed.

Figure 4:
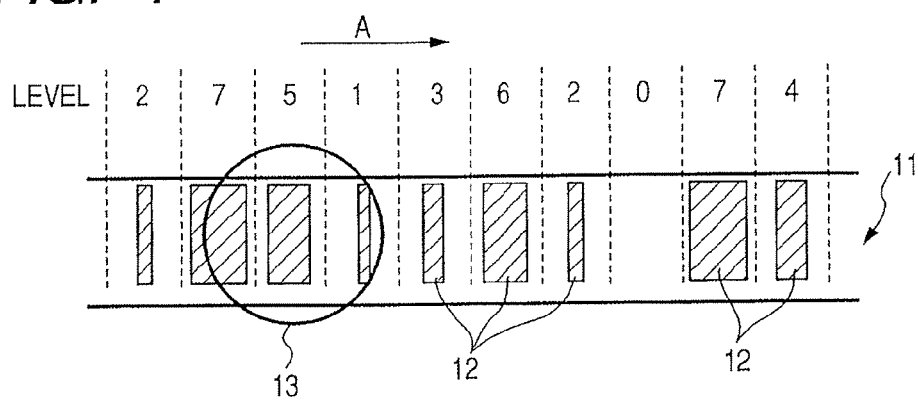
FIG. 4 is a schematic block diagram illustrating a relationship between a track having random information pits recorded thereon and a light spot, according to the present invention.

FIG. 4 illustrates a schematic block diagram showing a relationship between random information pits 12, which are composed by only conventional N-value pits and are recorded in a track 11 on an optical disk 4, and a light spot 13. When a phase-changeable material is used for a recordable/erasable recording material, for instance, an optical disk 4 is irradiated with a light spot 13, which can be a recording pulse, an erasure pulse and cooling pulse, by adjusting each light volume and timing. Thereby, the light spot 13 changes a shape of an information pit to form the information pits with a plurality of reproduction levels.

FIG. 4 illustrates information pits in rectangular shapes which vary in length in a track direction, for the sake of convenience. However, the shape of the information pit may not be rectangular, but may be, for instance, circular, elliptical or sagital, as long as the information pit of each level has an area corresponding to the level.

As a recordable/erasable recording material, a magneto-optical material other than the aforementioned phase-changeable material can also be used. With the magneto-optical recording medium, a magnetic field which is generated by a magnetic head, but is not shown in the drawing, is also applied and works together with the light spot in the optical information recording/reproducing device to change the shape of the information pit and form plural production levels of information pits.

Furthermore, a write-once recording material also can be used. An organic dye or a metallic film can be used as the recording material. When the recording material is used, an optical disk is irradiated with a light spot which adjusts the light quantity for recording and the timing therefor. Thereby, the light spot changes a shape of an information pit to form the information pits with a plurality of reproduction levels. Also, with a recording medium of reproduction-only, an information pit can be formed in a projection-depression shape, called a phase pit on a substrate, and thus, the information of a multivalued level can be recorded by modifying the area or optical depth of the phase pits.

For increasing the memory capacity, it is necessary to reduce the size of a cell, and when the size is reduced, a light spot 13 comes to contain two or three information pits of cells, as shown in FIG. 4. The principle of the present invention will be described for the recording method using a multivalued level while taking a case of using a phase-changeable material as the recording material.

In FIG. 4, a direction of an arrow (A) denotes a track direction similarly, and reference numeral 11 denotes a track on an optical disk 4 for recording an information pit therein. Regions partitioned by dashed lines are respective cells virtually arranged on the track 11. In addition, the information pits corresponding to the number of levels described in the upper part of FIG. 4, according to a method of FIG. 2, are recorded, as are denoted by reference numeral 12. Reference numeral 13 denotes a light spot.

Figure 5:
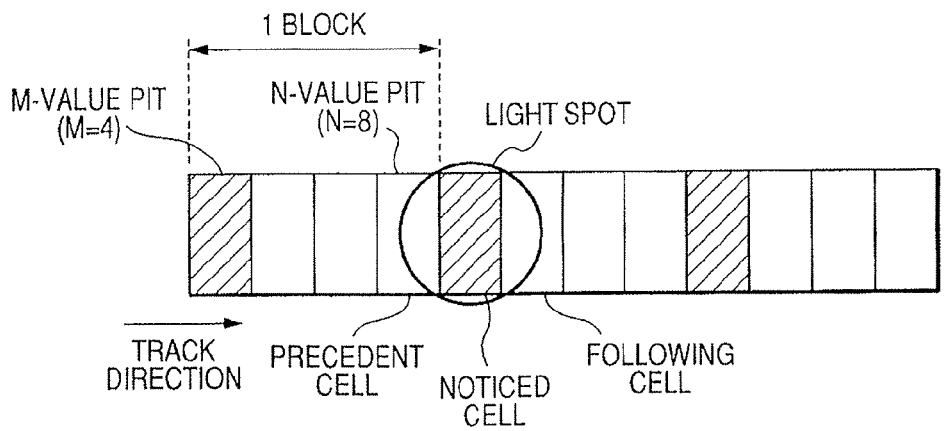
FIG. 5 is a schematic block diagram for describing a first unit in which one M-value pit is arranged in one block.
Figure 6:
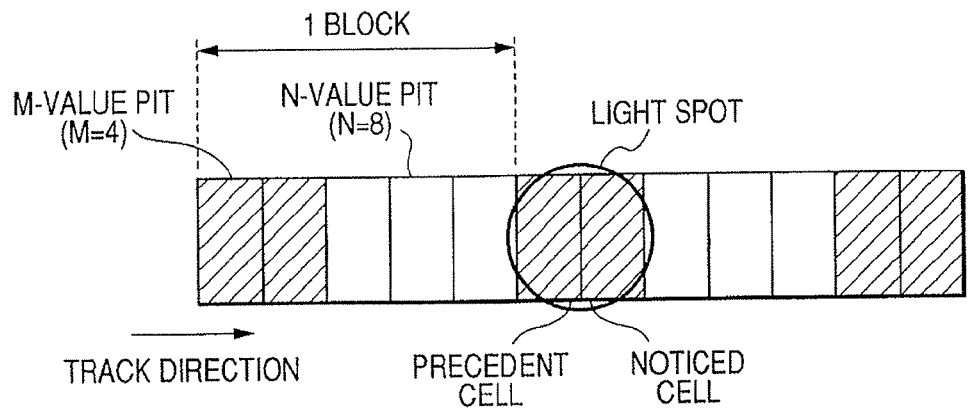
FIG. 6 is a schematic block diagram for describing a second unit in which two continuous M-value pits are arranged in one block.
Figure 7:
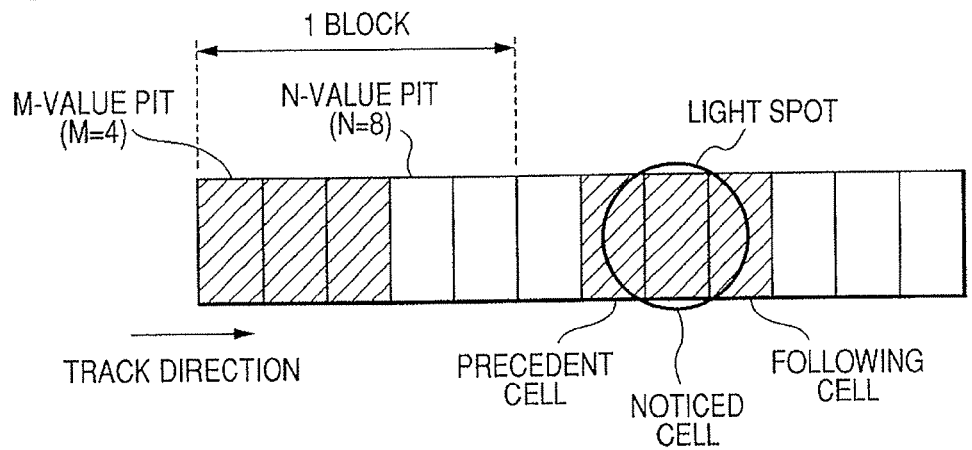
FIG. 7 is a schematic block diagram for describing a third unit in which continuous three M-value pits are arranged in one block.

In the present invention, information is not recorded by using only an N-value pit, as shown in FIG. 4, but also, is recorded by using an M-value of a decreased multivalue degree, in one part. The schematic block diagrams are shown in FIG. 5, FIG. 6 and FIG. 7. Specifically, the first and fourth units arrange one M-value pit in one block (FIG. 5). The second unit arranges continuous two M-value pits in one block (FIG. 6). The third unit arranges continuous three M-value pits in one block (FIG. 7).

In many cases, three N-value pits are contained in one block so as to simplify the description, but more N-value pits may be contained as a matter of course.

Here, a reproduced signal is sampled in order to detect a phase error for producing a reproduction clock for multivalued information recorded in the first to fourth units and produce phase error information. The first and third units produce the phase error information by using a reproduced signal level sampled in the center of a cell (cell center value), and the second unit produces the phase error information by using a reproduced signal level sampled in a boundary between adjacent cells (intercell value). The fourth unit detects a phase error by using detection timing when the reproduced signal crosses the ideal specified value, and the actual detection timing.

In the next place, a cell center value and an intercell value to be used for detecting phase error information according to the present invention will be described, on the basis of a result of an optical simulation with the use of a reproduced signal.

Figure 8:
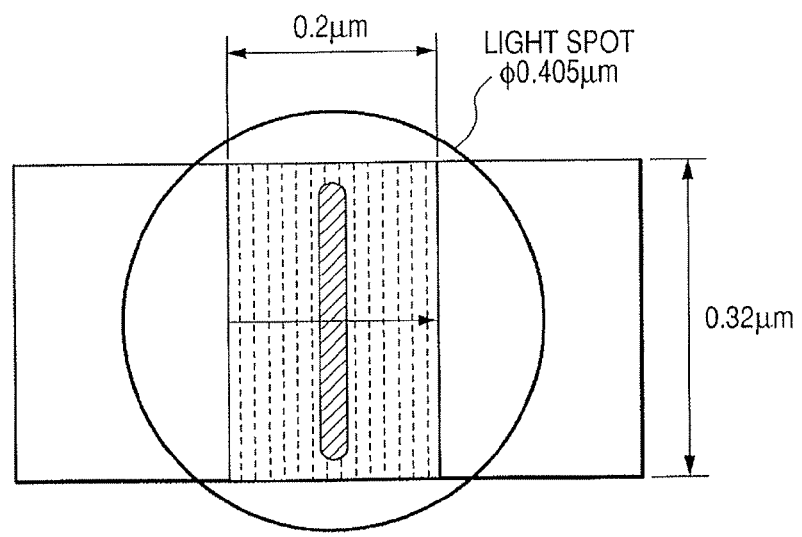
FIG. 8 is a view illustrating a parameter of an optical simulation for describing a reproduction principle according to the present invention.
Figure 9:
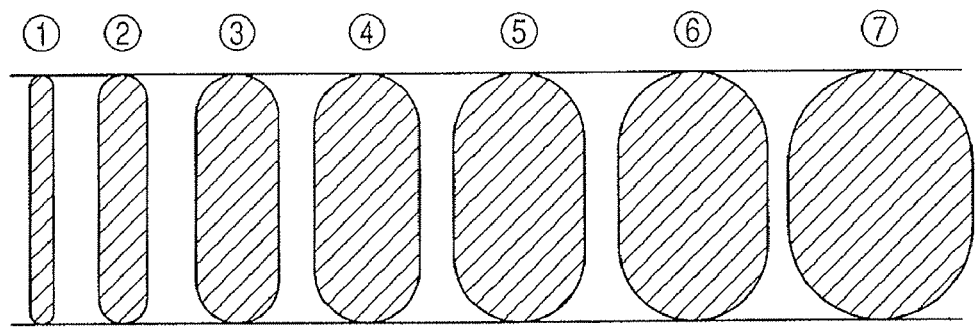
FIG. 9 is a view for describing a shape of an information pit given in an optical simulation for describing a reproduction principle according to the present invention.

FIG. 8 illustrates a parameter used in the optical simulation. A track pitch is set at 0.32 μm and a size of a light spot is set at 0.405 μm. (Wavelength is set at 405 nm and numerical aperture of an objective lens is set at NA 0.85.) A size of a cell is set at 0.2 μm, and an information pit is recorded by using an eight-value, as is illustrated in FIG. 2. FIG. 9 illustrates an information pit corresponding to each level in this case.

Figure 10:
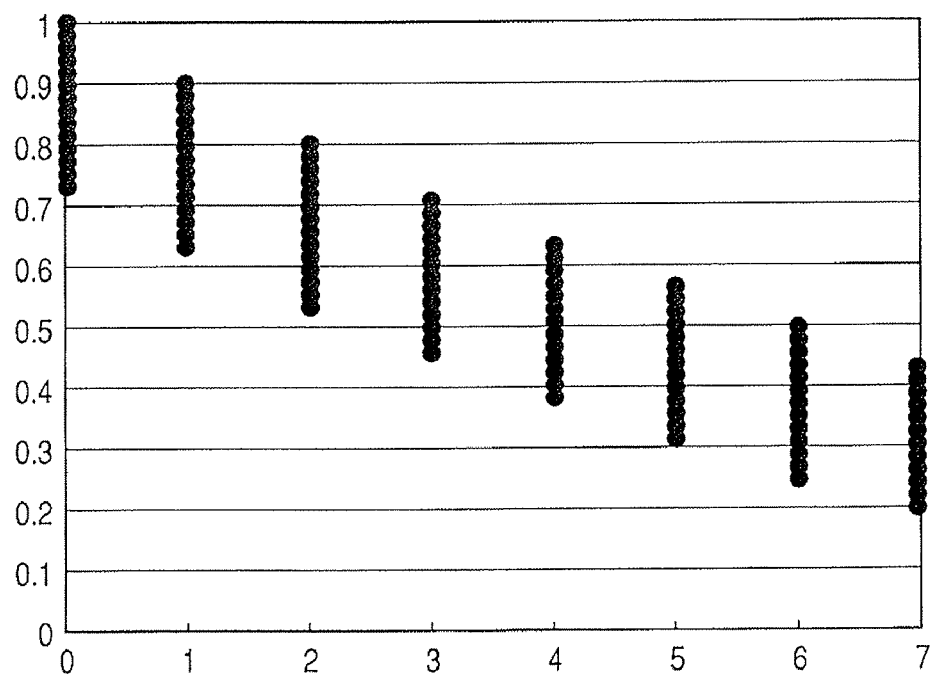
FIG. 10 is a view illustrating an amplitude distribution of cell center values in accordance with an optical parameter of an optical information recording/reproducing device according to the present invention.

Using the above conditions, eight levels of information were sequentially given to continuous three cells in combination (which has 8×8×8=512 types in total), and a reproduced signal (quantity of reflected light) as calculated while supposing the case of having moved a light spot from the first cell center to the third cell center. FIG. 10 illustrates a distribution of the reproduced signal level (cell center value) obtained at the center of the second cell. A horizontal axis shows a level of one cell and a vertical axis shows a reproduced signal level.

Figure 11:
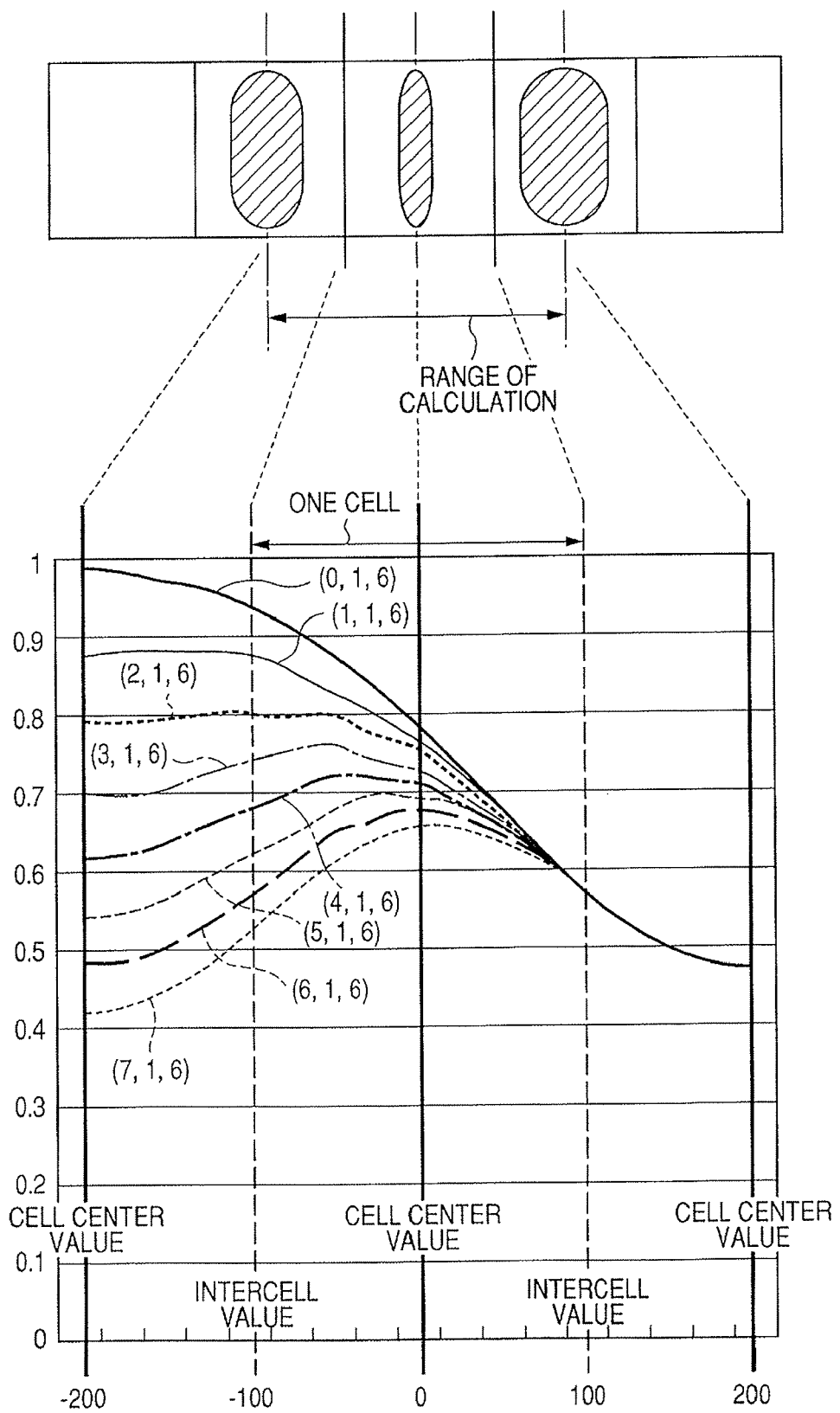
FIG. 11 is a view for describing reproduced signals with respect to a combination of information pits written in three continuous cells in accordance with a calculation result of an optical simulation for describing a reproduction principle according to the present invention.

FIG. 11 illustrates a result of an optical simulation, and shows reproduced signal levels according to a combination of information pits written in continuous three cells. FIG. 11 illustrates eight types of combinations of the level in the cell by taking eight cases of (0, 1, 6) to (7, 1, 6) as an example. (The levels are assumed to be 0 in all cells, except the three cells.)

Three continuous lines in the figure show the positions of reproduced signals (cell center value) when a light spot is positioned in the center of each cell, and two dashed lines show the positions of reproduced signals (intercell values) when the light spot is positioned in the boundary between a cell and the next cell.

(First Unit)

At first, a detecting method of the first unit according to the present invention will be described, which uses a cell center value in detecting phase error information. The method of the first unit for detecting the phase error information will be described with reference to FIG. 12. The figure illustrates a state of a cell center value when the levels show a combination of (0, 1, 6), as one example.

Reference character (A) denotes a value of an ideal reproduced signal in a cell that is recorded by 1 level of an M-value (equivalent to 3 level of an N-value, which corresponds to a track width of 75 nm), and is sampled at cell center time (k). Here, a method for detecting phase error information in a cell center value will be considered in order to consider a PLL control for obtaining a reproduction clock.

Suppose that real sampling time is (k') deviated from (k) and a sampled value of the real reproduced signal is (B). A curve shown by a dashed line in the figure is formed by connecting plotted points of ideal values of cell center values (0), (A) and (6), and a cell center value (B) of a real reproduced signal is also plotted there.

Figure 12:
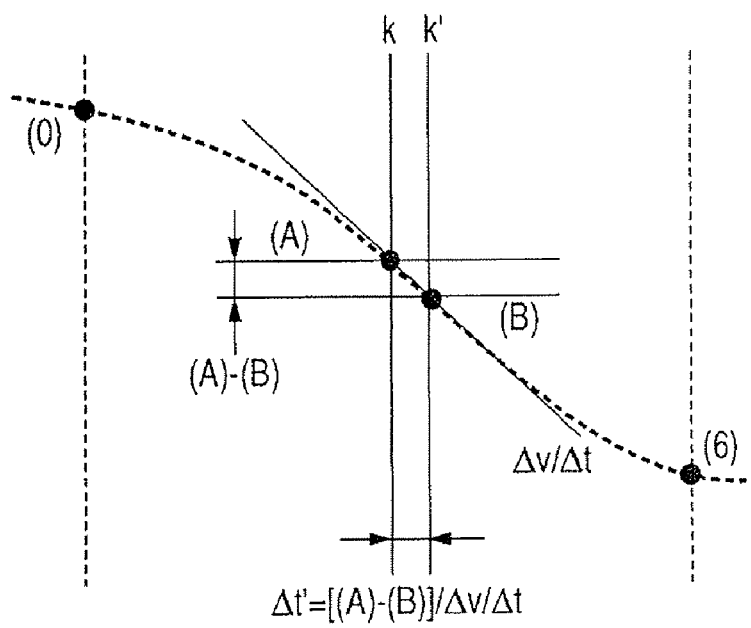
FIG. 12 is a view of changing reproduced signals for describing a method of detecting a phase error by using a first unit according to the present invention.
Figure 12:
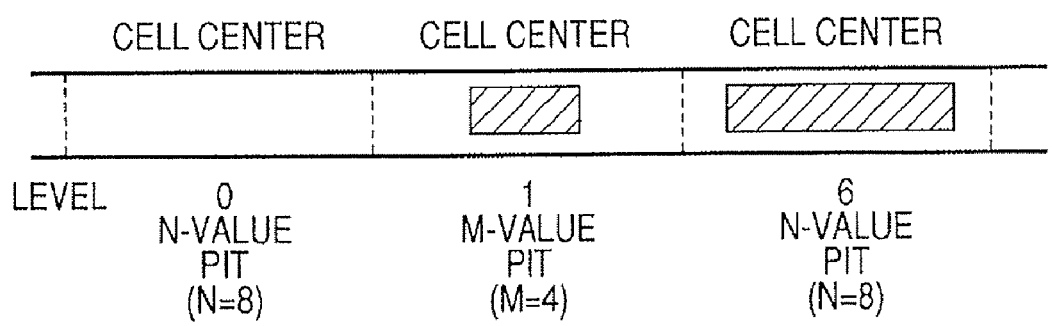

If cell center values are in a known state of (0, 1, 6) at the time, the ideal state of the cell center values has a relationship of (0), (A) and (6), as illustrated in FIG. 12, and the ideal value of the cell center value of the cell, which is recorded by using the M-value, and a gradient of the reproduced signal in the vicinity of the cell center value are also in the known state.

For this reason, three points to be considered are (1) an ideal gradient of a reproduced signal in the vicinity of a cell center value (gradient of a reproduced signal in the vicinity of the ideal value of the cell center value) ($\Delta v/\Delta t$), (2) an ideal value of a cell center value (A), and further, (3) a cell center value (B) of the real reproduced signal. Thereby, a phase error state of a sampling clock can be calculated. A phase error $\Delta t'$ of the sampling clock can be obtained from the following expression:

$$\Delta t' = [(A) - (B)]/(v\Delta/\Delta t).$$

In the above expression, ideal states of (1) and (2) are obtained by a simulation, or the like, or also can be obtained from a reproduction level obtained from a multivalued learning region in a known recording row arranged in the top of the recording data row, which will be described later. The latter can be rather adopted, because of reflecting various influences, such as recording states.

Next, calculation processes by using learned data will be described, which calculate a gradient of a reproduced signal in the vicinity of a cell center value and for a phase error. There is a method of calculating the gradient of the reproduced signal in the vicinity of the cell center value, by forming an approximated curve by using the center values of the learned data in continuous three cells, and calculating the gradient ($\Delta v/\Delta t$) in the vicinity of the cell center value from the gradient of the tangent line in the cell center value (A). Alternatively, there is a method of using the approximated curve itself as a curve for the gradient, which is the simplest example.

In the above description, continuous three cells for the learned data are the cells recorded, for instance, as a learning pit row by using an N-value, an M-value and an N-value, which will be described later. Then, each center value of the cells is detected. The gradient of a reproduced signal is calculated from the gradient of a tangent line in the center of the middle cell recorded by using the M-value, which is obtained form an approximated curve with the use of the center values of the three cells. The ideal value of the center value in the cell is the center value of the cell recorded by using the M-value, which is in the middle of the learning pit row.

When a device is actually working, the device evaluates the level of the center value in the cell recorded by using the M-value cell, while the device is reproducing (reference character (B) in FIG. 12). Then, the device detects the deviated period of a sampling time, namely, a phase error signal from a gradient ($\Delta v/\Delta t$) of a reproduced signal, which has been derived through the above-described method when learning, and a difference between the ideal value (A) of a center value in the cell and a center value (B) when reproduced in the cell.

Furthermore, the gradient at the cell center time (k) can be calculated with higher accuracy, by increasing the number of the cells to be used for calculating the gradient into five cells including the cells in both sides, so as to sandwich the cell at which the phase error is calculated.

As described above, the gradient of the reproduced signal ($\Delta v/\Delta t$) in the vicinity of a cell center is calculated on the basis of level information obtained from a center value in a cell, which is reproduced when learning. Then, a phase error signal is directly extracted from the reproduced signal obtained while the multivalued information is reproduced, by using the gradient ($\Delta v/\Delta t$) of the reproduced signal obtained during reproduction, the ideal level (A) of the center value in the cell obtained during learning, and a center value (B) of the real reproduced signal at the cell.

Here, it is important for detecting a phase error signal of high accuracy to evaluate the level of a center value in a cell while being reproduced with high accuracy. This is because the accuracy of the ideal gradient of a reproduced signal in the vicinity of the center of the cell, which is calculated from learned data, and the accuracy of the ideal value of the center value in a cell are naturally degraded when the evaluated value is wrong.

An optical information reproducing method according to the present invention arranges an M-value pit recorded by using a decreased multivalue degree, and, accordingly, can evaluate the level with higher accuracy than can a conventional method. When multivalued information has been reproduced, all of which has been recorded by using an eight-value, for instance, on conditions that a size of a light spot is about 0.405 µm, the track pitch of an optical is 0.32 µm, and the width of a cell is 0.2 µm, all the errors of evaluated values for the level ±1 level with respect to a correct value.

It would be clear from the result that there would be almost no error in evaluated values if multivalued information recorded by using a four-value would be reproduced. Accordingly, an optical information reproducing method according to the present invention can detect a phase error with high accuracy because of arranging an M-value pit of a decreased multivalued degree.

By the way, the above method detects center values in continuous three cells recorded by using an N-value, an M-value and an N-value when reproducing information, which are illustrated in FIG. 12. When there is no level difference between the center values in the cells recorded by using the N-value in front and back of a middle cell recorded by using the M-value or when the level difference is small, a gradient of reproduced signals becomes extremely small at the cell center. When a phase error is calculated on the basis of the gradient information, the accuracy of phase error information is degraded.

Accordingly, no phase error information should be detected when at least one center value of a cell out of cells in front and back of the middle cell recorded by using the M-value is not so different from the center value of the cell recorded by using the M-value as a predetermined difference, when the values have been reproduced. Thereby, the accuracy of a PLL control can be improved.

For instance, when each level of V(k−1), V(k) and V(k+1) of center values in continuous cells (k−1, k, k+1) has a relationship of |V(k−1)−V(k)|≦2 or |V(k)−V(k+1)|≦2, some action is taken so as to stop detecting phase error information.

In addition, when the values satisfy a relationship of V(k−1)<V(k)>V(k+1) or V(k−1)>V(k)<V(k+1), some action is taken so as to stop detecting phase error information. In the above description, V(k) shows a value obtained by converting the level of an M-value into that of an N-value.

An optical information reproducing method according to the present invention includes arranging virtual cells at regular spacing on a track of an optical information medium as described above, recording multivalued information by using a light spot while changing a length of an information pit in a track direction or an area of the information pit in the cell, and reproducing the multivalued information recorded in a recording/reproducing region, which is arranged on the optical information medium, so as to reproduce the multivalued information by detecting the level of a multistage reproduced signal from the information pit.

An optical information reproducing method according to the present invention includes arranging one cell recorded by using an M-value (M<N) at each of a plurality of cells recorded by using an N-value (N≧3) on a track, and sampling the reproduced signal of the cell recorded by using the M-value and detecting center values of reproduced signals in the cells. The optical information reproducing method includes the step of obtaining a phase error for producing a reproduction clock on the basis of the detected cell center value, a previously derived ideal value of a cell center value, and a previously derived gradient of the reproduced signal in the vicinity of the ideal value of the cell center value.

The ideal value of the center value in the cell and the gradient are derived by reproducing a multivalued learning region formed of information pits for learning, which are recorded in the head of the recording/reproducing region.

Alternatively, the ideal value of the cell center value and the gradient are derived by a simulation.

Obtaining the phase error includes obtaining the phase error for producing a reproduction clock from the gradient that is calculated from two or more center values of cells sandwiching the ideal value of the center value of the cell and a difference between the ideal value of the center value in the cell and the detected center value in the cell. In obtaining the phase error, when at least one cell recorded by using an N-value in both sides of a cell recorded by using an M-value has a level which is not so different from that of the center value in the cell recorded by using the M-value so as to exceed the preset value, the detection for a phase error is stopped.

(Second Unit)

Next, a detecting method of the second unit according to the present invention will be described, which uses a reproduced signal level of an intercell value in producing phase error information. At first, a feature of the intercell value will be described in detail with reference to FIG. 11 again.

When paying attention to reproduced signals (intercell value) in a boundary between adjacent cells in FIG. 11, it is understood that the intercell values show approximately the same value at the boundary between the right cell and the middle cell. In other words, when the combinations of levels in right and left cells are fixed (at "1" and "6" in this case), the level in the outside cell (cell on a left side in this case) does not largely affect the intercell value. Thus, it is understood that the codes interfere little with each other.

Figure 14:
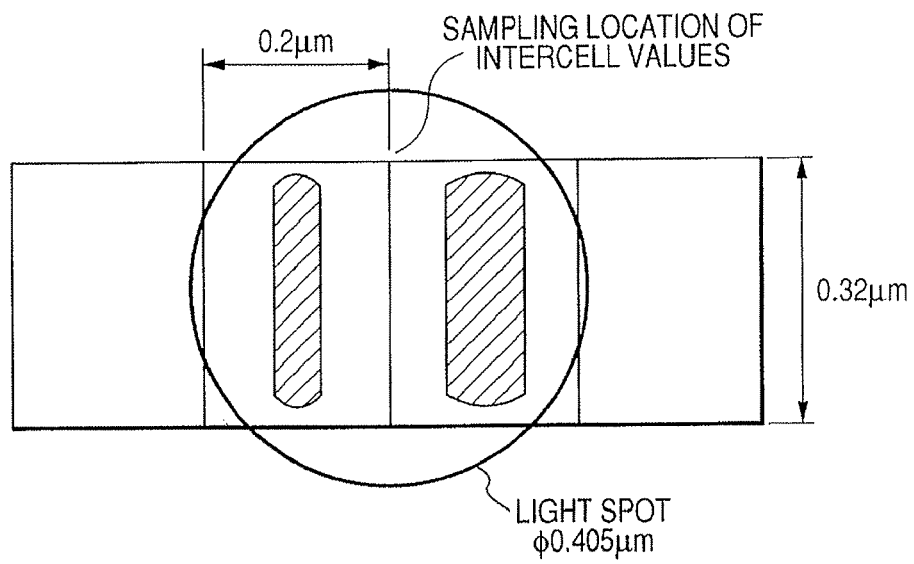
FIG. 14 is a view for describing a relationship between positions of cells in front and back and a light spot when an intercell value is sampled.

FIG. 14 illustrates a relationship among positions of a light spot, a right cell and a left cell, when the light spot comes on the boundary between the right and left cells. A light spot has a size of 0.405 µm while a width corresponding to the two cells is 0.4 µm, so that most parts of the light spot exit on the right and left cells. In other words, it is intuitively understood that the light spot is almost not affected by outside information.

Figure 15:
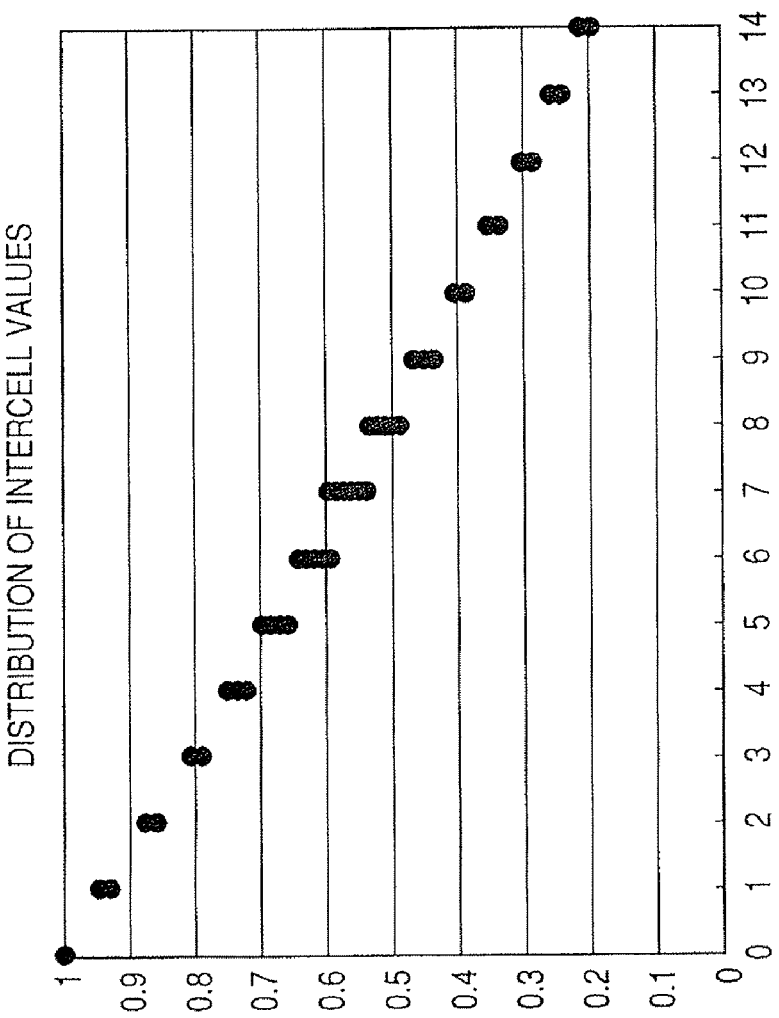
FIG. 15 is a view illustrating an amplitude distribution of an intercell value in accordance with an optical parameter of an optical information recording/reproducing device, and a combination of levels in right and left cells, according to the present invention.

A left figure in FIG. 15 illustrates an amplitude distribution of reproduced signals of an intercell value (standardized by reflectances of a pit part and a non-pit part) with respect to a combination of right and left cells (combination includes 8×8=64 types in total). A horizontal axis in the left figure shows the total value of levels in the right and left cells. The total value can be specifically classified into fifteen values from a 0 value of (0, 0) to a 14 value of (7, 7).

It is understood that the reproduced signals of the intercell value are separated into fifteen values from 0 to 14, even though signal processing, such as waveform equalization, is not applied. A right figure in FIG. 15 illustrates a combination of levels in right and left cells corresponding to respective fifteen values.

Next, a phenomenon on a principle of the second unit according to the present invention will be described on the basis of the above-described feature of the reproduced signal. In FIG. 11, when paying attention to the change of signal levels among a center value in a cell, an intercell value and a center value in a cell, both phenomena are understood to happen that the signal levels are adequately separated in the intercell value on the left side, while a gradient of the signal change is approximately constant in the vicinity of the intercell value on the right side.

From the above facts, an intercell value in an ideal state and, simultaneously, a gradient of reproduced signals in the vicinity of the intercell value can be assumed, when the levels of multiple values of a center value in cells in front and back of an intercell value are determined.

A second unit according to the present invention is characterized in that the unit obtains phase error information from a reproduced signal itself by using the above phenomena. The second unit needs to sample both a center value of a cell (to be used for reproducing information) and intercell values to be used for detecting a phase error, and, accordingly, requires a reproduction clock to have a speed of two or more times a cell period.

A method of detecting a phase error by the second unit will now be described with reference to FIG. 16. The figure illustrates an example of having set a state of center values in cells at a combination of (0, 3). In the figure, reference character (A) denotes a value of the ideal reproduced signal of a cell recorded by 0 level of an M-value (equivalent to 1 level of an N-value, namely, a width of 25 nm) and three level of the M-value (equivalent to level of the M-value (equivalent to seven level of the N-value, namely, a width of 175 nm) sampled at the time (k) of an intercell.

Here, a method for detecting phase error information in an intercell value will be considered in order to consider a PLL control for obtaining a reproduction clock. Suppose that real sampling time is (k') deviated form (k) and a sampled value of the real reproduced signal is (B). A curve shown by a dashed line in the figure is formed by connecting plotted points of ideal values of cell center values (0), (3) and (A), and an intercell value (B) of a real reproduced signal is also plotted there.

Figure 16:
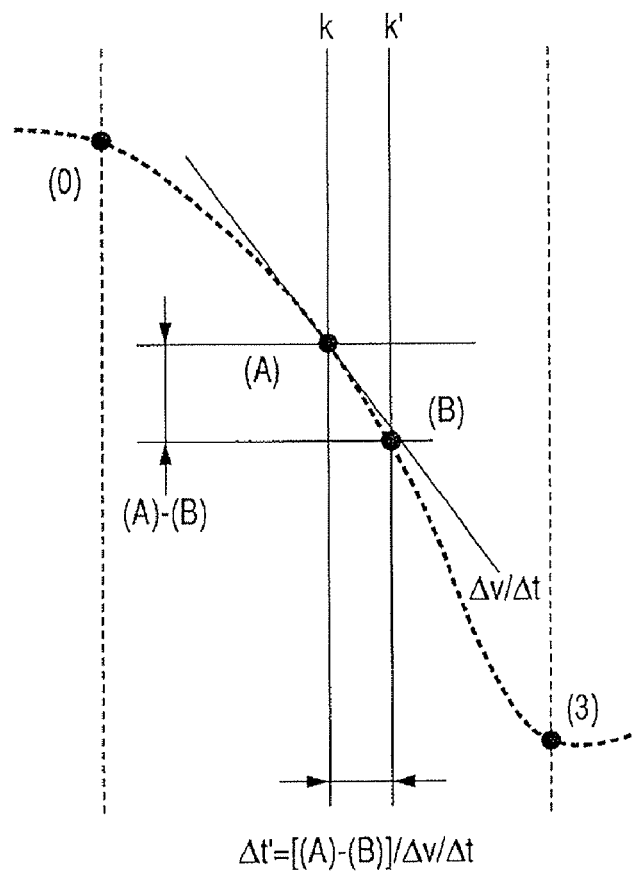
FIG. 16 is a view of changing reproduced signals for describing a method of detecting a phase error by using a second unit according to the present invention.
Figure 16:
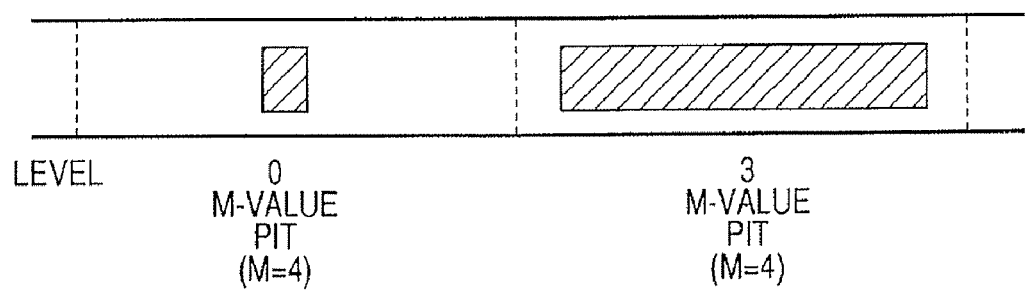

If cell center values are in a known state of (0, 3) at the time, the ideal state of the cell center values has a relationship of (0), (3) and (A), as illustrated in FIG. 16, and the ideal value of the intercell value and a gradient of the reproduced signals in the vicinity of the intercell value are also in the known state.

For this reason, three points to be considered are (1) an ideal gradient of reproduced signals in the vicinity of an intercell value (gradient of reproduced signals in the vicinity of the ideal value of the intercell value) ($\Delta v/\Delta t$), (2) an ideal value of an intercell value (A), and further (3) an intercell value (B) of the real reproduced signals. Thereby, a phase error stage $\Delta t'$ of a sampling clock can be calculated. A phase error $\Delta t'$ of the sampling clock can be obtained from the following expression:

$$\Delta t' = [(A)-(B)]/(\Delta v/\Delta t).$$

In the above expression, ideal states of (1) and (2) are obtained by a simulation, or the like, or also can be obtained from a reproduction level obtained from a multivalued learning region in a known recording row arranged in the head of the recording data row, which will be described later. The latter can be adopted, because of reflecting various influences, such as recorded states.

Next, calculation processes by using learned data will be described, which calculates a gradient of a reproduced signal in the vicinity of an intercell value and a phase error. The simplest example for calculating the gradient of the reproduced signals in the vicinity of the intercell value includes a process of forming an approximated straight line by using the center values of the learned data in continuous two cells, and calculating the gradient in the vicinity of the boundary between cells.

In the above description, continuous two cells for the learned data are the cells recorded, for instance, as a learning pit row by using an M-value, which will be described later. Then, each center value of the cells is detected. The gradient of reproduced signals in the vicinity of a boundary between the two cells recorded by using an M-value is calculated from an approximated straight line by connecting center values of the two cells. The ideal value of the intercell value recorded as a learned pit is a reproduced signal level at a boundary between the two cells recorded by using the M-value.

When a device is actually working, the device evaluates the level of the intercell value while the device is reproducing, (which corresponds to reference character (B) in FIG. 16). Then, the device detects the deviated period of a sampling time, namely, a phase error signal from a gradient ($\Delta v/\Delta t$) of reproduced signals, which has been derived through the above-described method when learning, and a difference between the ideal value (A) of an intercell value and an intercell value (B) obtained when reproduced.

Furthermore, there is a method of adding the intercell value located in between the continuous two cells recorded by using the M-value on learned data to the center values of the two cells, forming an approximated curve by using values at the above three points, and calculating the gradient ($\Delta v/\Delta t$) in the vicinity of the intercell value from the gradient of the tangent line in the intercell value (A). Alternatively, a phase error signal can be calculated from a difference between an intercell value (A) obtained by learning and an intercell value (B) obtained during reproduction, with higher accuracy, by using the approximated curve itself as the gradient curve.

Furthermore, the gradient at the intercell time (k) can be calculated with higher accuracy, by increasing the number of the cells to be used for calculating the gradient into four cells, including the cells in both sides so as to sandwich the boundary at which the phase error is calculated.

As described above, the gradient of the reproduced signals ($\Delta v/\Delta t$) in the vicinity of an intercell is calculated on the basis of level information obtained from center values in cells, which are reproduced when learning. Then, a phase error signal is directly extracted from the reproduced signal obtained while the multivalued information is reproduced by using the gradient ($\Delta v/\Delta t$) of the reproduced signals obtained during reproduction, and a difference between the ideal level (A) of the intercell value obtained during learning and an intercell value (B) of the real reproduced signal.

When there is no level difference between the center values in the continuous two cells recorded by using the M-value illustrated in FIG. 16, while the multivalued information has been reproduced, or when the level difference is small, a gradient of reproduced signals becomes extremely small, at the boundary between the cells. When a phase error is calculated on the basis of the gradient information, the accuracy of phase error information is degraded. Accordingly, when levels of center values in continuous two cells, which have been evaluated during the reproduction, have such a difference between them so as not to exceed a predetermined value, the accuracy of PLL control can be further improved by operating the device so that no phase error information cannot be detected.

For instance, when each level of V(k−1) had V(k) of center values in continuous cells (k−1, k) has a relationship of |V(k−1)−V(k)|≦3, some action shall be taken so as to stop detecting phase error information. V(k−1) and V(k) show values obtained by converting the level of an M-value into that of an N-value.

An optical information reproducing method according to the present invention includes arranging continuous two cells having information recorded by using an M-value (M<N) at each plurality of the cells having information recorded by an N-value (N≧3) on a track of an optical information medium, sampling reproduced signals recorded by the M-value in the continuous two cells, and detecting the intercell value between the reproduced signals. The optical information reproducing method also includes obtaining a phase error for producing a reproduction clock on the basis of the detected intercell value, a previously derived ideal value of the intercell value, and a previously derived gradient of the reproduced signals in the vicinity of the ideal value of the intercell value.

The ideal value of the center value in the cell and the gradient are derived by reproducing a multivalued learning region formed of information pits for learning, which are recorded in the head of the recording/reproducing region. Alternatively, the ideal value of the intercell value and the gradient are derived by a simulation.

The obtaining of the phase error includes obtaining the phase error for producing a reproduction clock from the gradient that is calculated from center values of continuous two cells recorded by using an M-value, and a difference between the ideal value of the intercell value and the detected intercell value. In obtaining the phase error, when a level difference between the center values in continuous two cells recorded by using the M-value is within the preset value, the detection for a phase error is stopped.

(Third Unit)

In the next place, a detecting method of the third unit according to the present invention will be described, which uses a cell center value in detecting phase error information. The method of the third unit for detecting the phase error information will be described with reference to FIG. 13. The figure illustrates a state of a cell center value when the levels show a combination of (0, 1, 3), as one example. Reference character (A) denotes a value of an ideal reproduced signal in a cell that is recorded by 1 level of an M-value (equivalent to 3 level of an N-value, which corresponds to width of 75 nm), and is sampled at cell center time (k).

Here, a method for detecting phase error information in a cell center value will be considered in order to consider a PLL control for obtaining a reproduction clock. Suppose that real sampling time is (k') deviated from (k) and a sampled value of the real reproduced signal is (B). A curve, shown by a dashed line in the figure, is formed by connecting plotted points of ideal values of cell center values (0), (A) and (3), and a cell center value (B) of a real reproduced signal is also plotted there.

Figure 13:
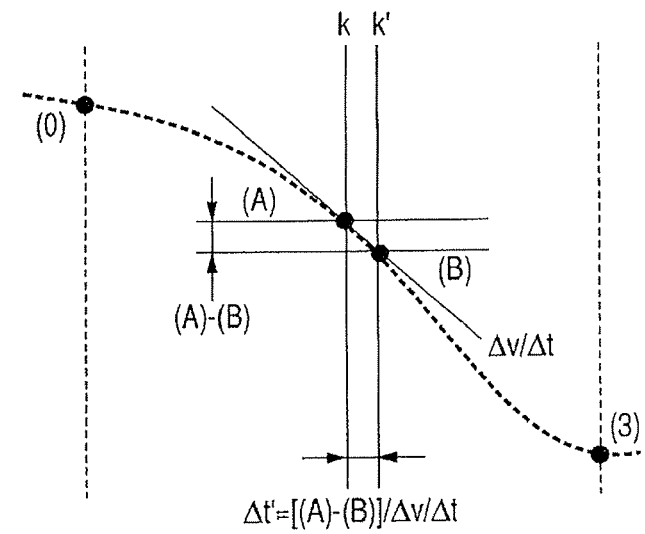
FIG. 13 is a view of changing reproduced signals for describing a method of detecting a phase error by using a third unit according to the present invention.
Figure 13:
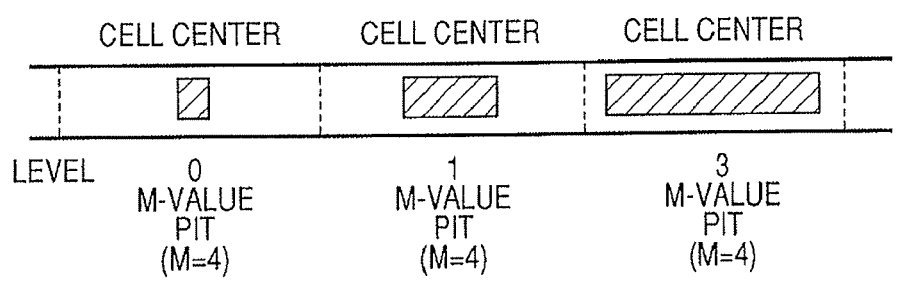

If cell center values are in a known state of (0, 1, 3) at that time, the ideal state of the cell center values has a relationship of (0), (A) and (3), as illustrated in FIG. 13, and the ideal value of the center value in the cell, which is recorded by using the M-value, and a gradient of the reproduced signal in the vicinity of the cell center value are also in the known state.

For this reason, three points to be considered are (1) an ideal gradient of a reproduced signal in the vicinity of a cell center value (gradient of reproduced signal in the vicinity of the ideal value of the cell center value) ($\Delta v/\Delta t$), (2) an ideal value of a cell center value (A), and further, (3) a cell center value (B) of the real reproduced signal. Thereby, a phase error state of $\Delta t'$ of a sampling clock can be calculated. A phase error $\Delta t'$ of the sampling clock can be obtained from the following expression:

$$\Delta t' = [(A)-(B)]/(\Delta v/\Delta t).$$

In the above expression, ideal states of (1) and (2) are obtained by a simulation, or the like, or also can be obtained from a reproduction level obtained from a multivalued learning region in a known recording row arranged in the head of the recording data row, which will be described later. The latter can be rather adopted, because of reflecting various influences, such as recorded states.

Next, calculation processes by using learned data will be described, which calculate a gradient of a reproduced signal in the vicinity of a cell center value and a phase error. There is a method of calculating the gradient of reproduced signals in the vicinity of the middle cell, by forming an approximated curve by using the center values of the learned data in continuous three cells, and calculating the gradient ($\Delta v/\Delta t$) in the vicinity of the intercell value from the gradient of the tangent line at the cell center value (A). Alternatively, there is a method of using the approximated curve itself as a curve for the gradient, which is the simplest example.

In the above description, continuous three cells for the learned data are the cells recorded, for instance, as a learning pit by using an M-value, which will be described later, and each cell center value is detected. The gradient of reproduced signals in the vicinity of the cell center is calculated from the gradient of a tangent line in the center of the middle cell recorded by using the M-value, which is obtained from an approximated curve with the use of the center values of the three cells. The ideal value of the center value of a cell recorded as a learned pit is a reproduced signal level in the center of the middle cell recorded by using the M-value.

When a device is actually reproducing information, the device evaluates the level of the center value in the cell while the device is reproducing the information (reference character (B) in FIG. 13). Then, the device detects the deviated period of a sampling time, namely, a phase error signal from a gradient ($\Delta v/\Delta t$) of a reproduced signal, which has been derived through the above-described method when learning, and a difference between the ideal value (A) of a center value in the cell and a center value (B) when reproduced in the cell.

Furthermore, the gradient at the cell center time (k) can be calculated with higher accuracy, by increasing the number of the cells to be used for calculating the gradient into five cells, including the cells in both sides, so as to sandwich the cell at which the phase error is calculated.

As described above, the gradient of the reproduced signal ($\Delta v/\Delta t$) in the vicinity of a cell center is calculated on the basis of level information obtained from a center value in a cell, which is reproduced when learning. Then, a phase error signal is directly extracted from the reproduced signal obtained while the multivalued information is reproduced, by using the gradient ($\Delta v/\Delta t$) of the reproduced signals, and the ideal level (A) of the center value in the cell and a center value (B) of the real reproduced signal.

Here, it is important for detecting a phase error signal of high accuracy to evaluate the level of a center value in a cell while being reproduced with high accuracy. This is because the accuracy of the ideal gradient of a reproduced signal in the vicinity of the center of the cell, which is calculated from learned data, and the accuracy of the ideal value of the center value in a cell, are naturally degraded when the evaluated value is wrong.

An optical information reproducing method according to the third unit arranges continuous three M-value pits recorded by using a decreased multivalued degree, and, accordingly, can evaluate the level with higher accuracy than a conventional method. When multivalued information has been reproduced, all of which have been recorded by using an eight-value, for instance, on conditions that a size of a light spot is about 0.405 μm, the track pitch of an optical disk is 0.32 μm and the width of a cell is 0.2 μm, all of the errors of evaluated values for the level were ±1 level with respect to a correct value.

It would be clear form the result that there would be almost no error in evaluated values if multivalued information recorded by using a four-value would be reproduced. Accordingly, an optical information reproducing method according to the present invention can detect a phase error signal with high accuracy because of arranging an M-value pit of a decreased multivalued degree.

By the way, the above method detects center values in continuous three cells recorded by using an M-value when reproducing information, which are illustrated in FIG. 13. When there is no level difference between the center values in the cells recorded by using the M-value in front and back of a middle cell or when the level difference is small, a gradient of reproduced signals becomes extremely small at the middle cell. When a phase error is calculated on the basis of the gradient information, the accuracy of phase error information is degraded.

Accordingly, no phase error information should be detected when at least one center value of a cell out of cells in front and back of the middle cell recorded by using the M-value is not so different from the center value of the cell recorded by using the M-value as a predetermined difference, when the values have been reproduced. Thereby, the accuracy of a PLL control can be improved.

For instance, when each level of V(k−1), V(k) and V(k+1) of center values in continuous cells (k−1, k, k+1) has a relationship of |V(k−1)−V(k)|≦1 or |V(k)−V(k+1)|≦1, some action shall be taken so as to stop detecting phase error information.

In addition, when the values satisfy a relationship of V(k−1)<V(k)>V(k+1) or V(k−1)>V(k)<V(k+1), some action shall be taken so as to stop detecting phase error information. In the above description, V(k−1), V(k) and V(k+1) show values obtained by converting the level of an M-value into that of an N-value.

The third unit according to the present invention degrades format efficiency because three cells have a decreased multiple value degree, but can provide phase error information with high accuracy because the unit can detect the level of the cells in front and back of the middle cell with higher accuracy.

An optical information reproducing method according to the present invention includes arranging continuous three cells having information recorded by an M-value (M<N), at each plurality of the cells having information recorded by an N-value (N≧3) on a track of an optical information medium, sampling reproduced signals recorded by the M-value in the continuous three cells, and detecting the center value of the middle cell among the continuous cells recorded by the M-value. The optical information reproducing method also includes obtaining a phase error for producing a reproduction clock on the basis of the detected cell center value, a previously derived ideal value of the cell center value, and a previously derived gradient of reproduced signals in the vicinity of the ideal value of the cell center value.

The ideal value of the center value in the cell and a gradient are derived by reproducing a multivalued learning region formed of information pits for learning, which are recorded in the head of the above-described recording/reproducing region. Alternatively, the ideal value of the cell center value and the gradient are derived by a simulation. Obtaining the phase error includes obtaining the phase error for producing a reproduction clock from the gradient that is calculated from center values of continuous three cells recorded by using an M-value, and a difference between the ideal value of the intercell value and the detected intercell value.

In addition, in obtaining the phase error, when the center value of at least one cell in both sides of the middle cell among continuous three cells recorded by using the M-value has not such a different level from that of the center value of the middle cell as a predetermined difference, the detection for a phase error shall be stopped.

(Fourth Unit)

In the last place, a producing method of the fourth unit according to the present invention will be described, which uses a cell center value in producing phase error information. The fourth unit is different from the first to third units. The fourth unit does not use a gradient (Δv/Δt) of ideal reproduced signals in the vicinity of a cell center value or an intercell value, but calculates a phase error state Δt' of a sampling clock.

A method of producing a phase error by the fourth unit according to the present invention will now be described with reference to FIG. 23. The figure illustrates a state of a cell center value when the levels show a combination of (0, 1, 6), as one example. Reference character (A) denotes a value of an ideal reproduced signal in a cell that is recorded by one level of an M-value (equivalent to 3 level of an N-value, which corresponds to a width of 75 nm), and is sampled at a cell center time (k).

Here, a method for detecting phase error information in a cell center value will be considered in order to consider a PLL control for obtaining a reproduction clock. Suppose that real sampling time is (k') deviated from (k) and a sampled value of the real reproduced signal is (B). A curve shown by a dashed line in the figure is formed by connecting plotted points of ideal values of cell center values (0), (A) and (6), and a cell center value (B) of a real reproduced signal is also plotted there.

Figure 23:
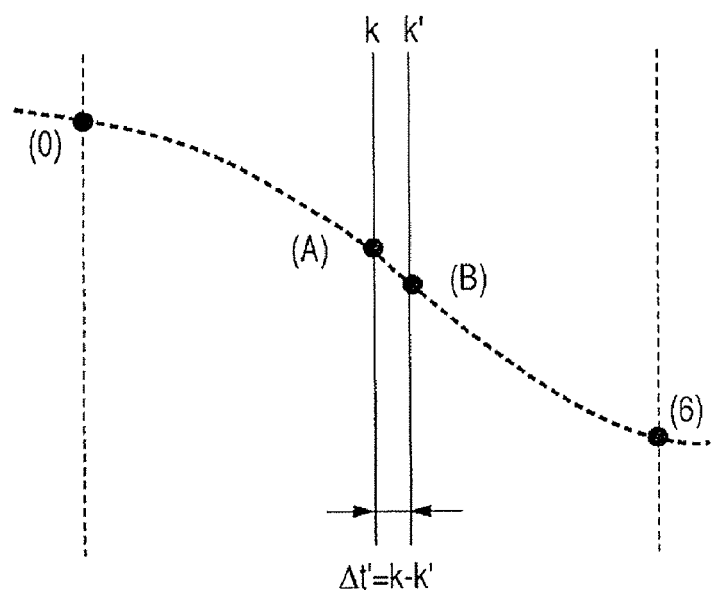
FIG. 23 is a view of changing reproduced signals for describing a method of detecting a phase error by using a fourth unit according to the present invention.
Figure 23:
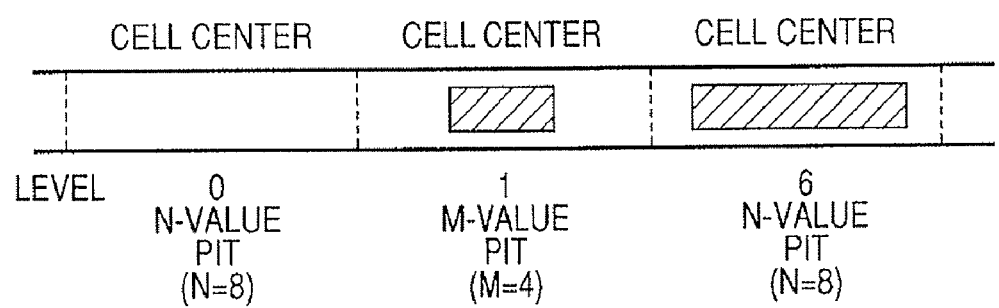

If cell center values are in a known state of (0, 1, 6) at the time, the ideal state of the cell center values has a relationship of (0), (A) and (6), as illustrated in FIG. 23, and the ideal value of the center value in the cell is also in the known state, which is recorded by using the M-value.

For this reason, two points can be considered are (1) cell center time (k) extracted just when a real reproduced signal passes through an ideal value (A) of a cell center value, and (2) sampling time (k') for the cell center value (B) of the real reproduced signal. Thereby, a phase error state of a sampling clock Δt'=k−k' can be calculated. In the above description (2), the sampling time (k') for the cell center value (B) of the real reproduced signal means the timing of sampling the cell center value of the real reproduced signal.

In the above description (1), cell center time (k) means the timing extracted when the real reproduced signal passes through the ideal value (A) of the cell center value. The time can be determined by detecting a point at which the real reproduced signal crosses the ideal value (A) of the cell center value (which is defined as a cross point (A)). When detecting the above point, it shall be considered to minutely sample the real reproduced signals by using a clock having a higher frequency than the sampling clock in order to detect the data.

For instance, there is a technique of detecting the cross point (A) at which two continuously sampled real reproduced signals among those sampled at data-detecting points change from a value of ">(A)" to a value of "<(A)", or change from the value of "<(A)" to the value of ">(A)". There is another technique of detecting the cross point (A) at which three continuous points among sampled real reproduced signals change from the value of ">(A)" to the value of "<(A)" through "(A)", or change from the value of "<(A)" to the value of ">(A)" through "(A)". As thus described, the cross point (A) is detected, the timing is extracted, and cell center time (k) is determined.

The deviated period of sampling time, namely, a phase error signal is detected from a difference between cell center time (k) and sampling time (k') described in the time (2).

The ideal value (A) of a cell center value can be obtained not only from an ideal state obtained by a simulation, or the like, but also, from a reproduction level obtained from a multivalued learning region in a known recording row arranged in the head of the recording data row, which will be described later. The latter can be adopted, because of reflecting various influences, such as a recorded state.

The thus obtained cell center time (k), which has been extracted when the cell center value reproduced during learning passes through an ideal level (A) of the cell center value on the basis of the level information is compared with the sampling time (k') of the cell center value (B) of the real reproduced signal. Thereby, a phase error signal can be directly extracted from a reproduced signal, when multivalued information is reproduced.

Here, it is important for detecting a phase error signal with a high accuracy to evaluate the level of a center value in a cell while being reproduced with high accuracy. This is because the accuracy of the ideal gradient of a reproduced signal in the vicinity of the center of the cell, which is calculated from learned data, and the accuracy of the ideal value of the center value in a cell, are naturally degraded when the evaluated value is wrong.

An optical information reproducing method according to the present invention arranges an M-value pit recorded by using a decreased multivalued degree, and, accordingly, can evaluate the level with higher accuracy than a conventional method. When multivalued information has been reproduced, all of which have been recorded by using an eight-value, for instance, on conditions that a size of a light spot is about 0.405 μm, the track pitch of an optical disk is 0.32 μm and the width of a cell is 0.2 μm, all the errors of evaluated values for the level were ±1 level with respect to a correct value. It would be clear from the result that there would be almost no error in evaluated values if multivalued information recorded by using a four-value would be reproduced. Accordingly, an optical information reproducing method according to the present invention can detect a phase error signal with high accuracy because of arranging an M-value pit of a decreased multivalued degree.

By the way, when there is no level difference between at least two center values among continuous three cells, or when the level difference is small, a gradient of reproduced signals becomes extremely small in the cell center value. When a phase error is calculated on the basis of the gradient information, the accuracy of phase error information is degraded. Accordingly, when levels of center values of at least two cells among continuous three cells, which have been evaluated during the reproduction, have such a difference between them so as not to exceed a predetermined value, the accuracy of PLL control can be further improved by operating the device so that no phase error information can be detected.

For instance, when each level of V(k−1), V(k) and V(k+1) of center values in continuous cells (k1, k, k+1) has a relationship of $|V(k-1)-V(k)| \leq 2$ or $|V(k)-V(k+1)| \leq 2$, some action shall be taken so as to stop detecting phase error information.

In addition, when the values satisfy a relationship of V(k−1)<V(k)>V(k+1) or V(k−1)>V(k)<V(k+1), some action shall be taken so as to stop detecting phase error information. In the above description, V(k) shows a value obtained by converting the level of an M-value into that of an N-value.

An optical information reproducing method according to the present invention includes arranging one cell recorded by using an M-value (M<N) at each of a plurality of cells recorded by using an N-value (N≧3) on a track, detecting the timing of sampling the cell center value of a reproduced signal recorded by the M-value in the cell, detecting the timing when the reproduced signal comes on the previously derived ideal value of the cell center value, and further, obtaining a phase error for producing a reproduction clock on the basis of a difference between the timing of sampling the cell center value of the detected reproduced signal and the timing when the reproduced signal comes on the ideal value of the cell center value.

The ideal value of the center value in the cell is derived by reproducing a multivalued learning region formed of information pits for learning, which are recorded in the head of the recording/reproducing region, or is derived by a simulation. In obtaining the phase error, when at least one cell recorded by using an N-value in both sides of a cell recorded by using an M-value has a level, which is not so different from that of the center value in the cell recorded by using the M-value so as to exceed the preset value, an operation for detecting the phase error shall be stopped.

Figure 17:
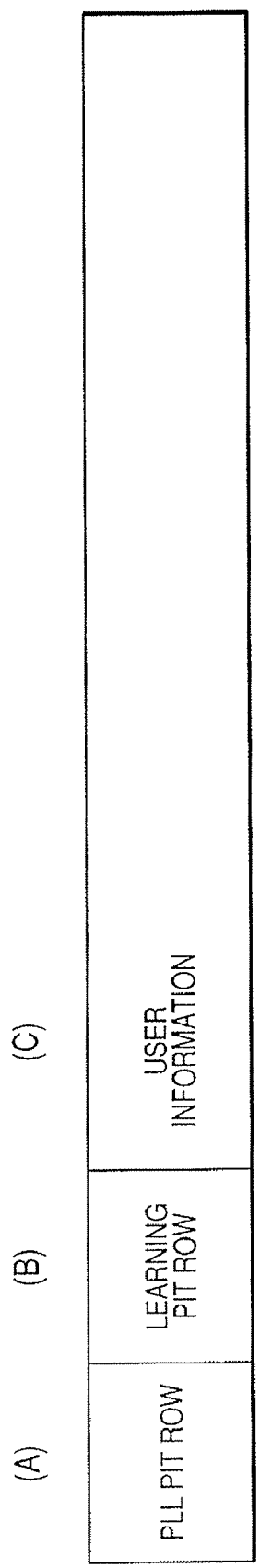
FIG. 17 is a view for describing a recorded information row according to the present invention.

In the next place, a phase error detection method according to the present invention will be described in relation to an actual operation for a device to be used therefor. At first, FIG. 17 illustrates a recorded information row.

Reference character (A) denotes a pit row for a PLL lock-in located in the head of recorded data, which is adopted in many cases, no matter what the multivalued recording is.

Reference character (B) denotes a pit row for learning, and for obtaining an ideal reproduced signal of the known pit row.

Reference character (C) denotes a pit row for using information to be recorded, which is produced after having been subjected to a process, such as error correction.

As described above, a device according to the present invention does not need to insert a special pit row for PLL control with the use of a reproduction clock.

Figure 18:
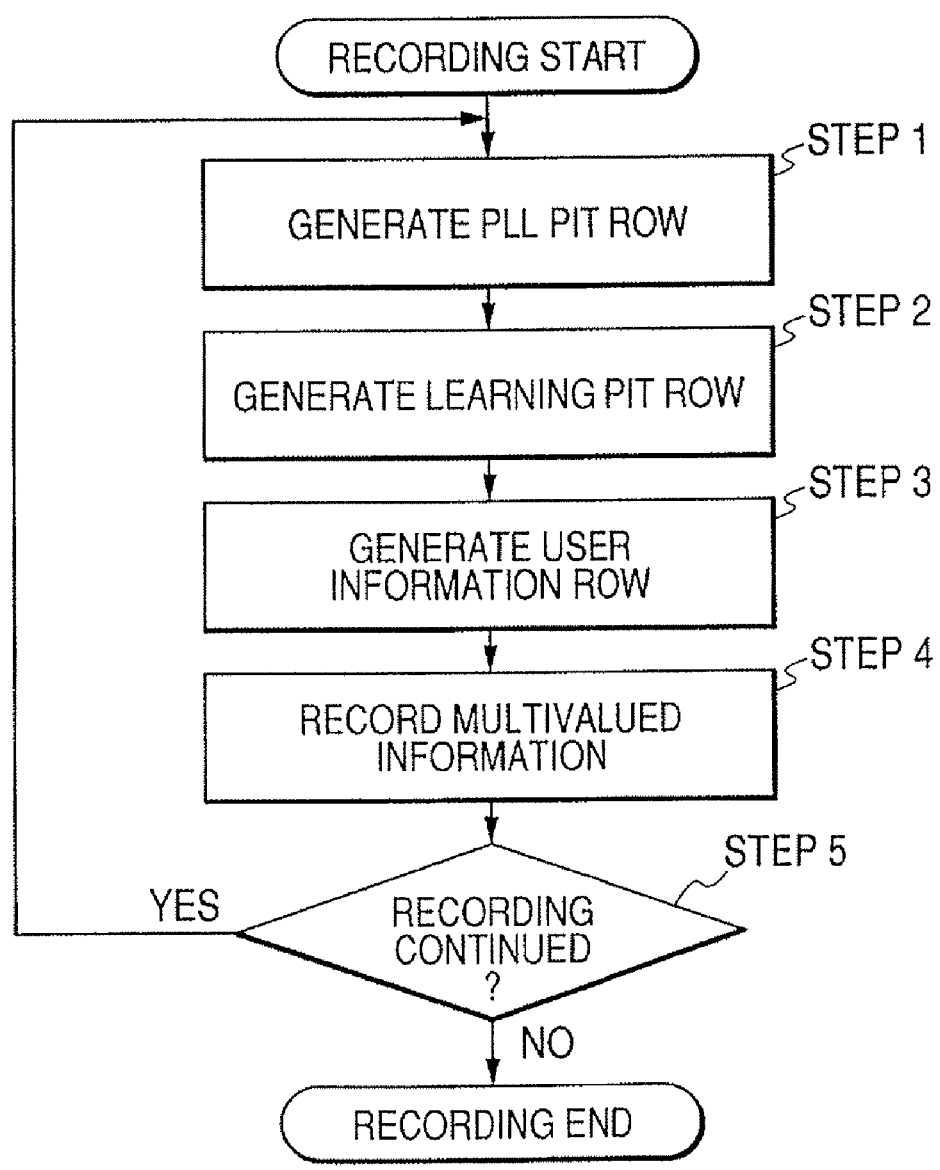
FIG. 18 is a flow chart for describing the information-recording steps of an optical information recording/reproducing device according to the present invention.
Figure 19:
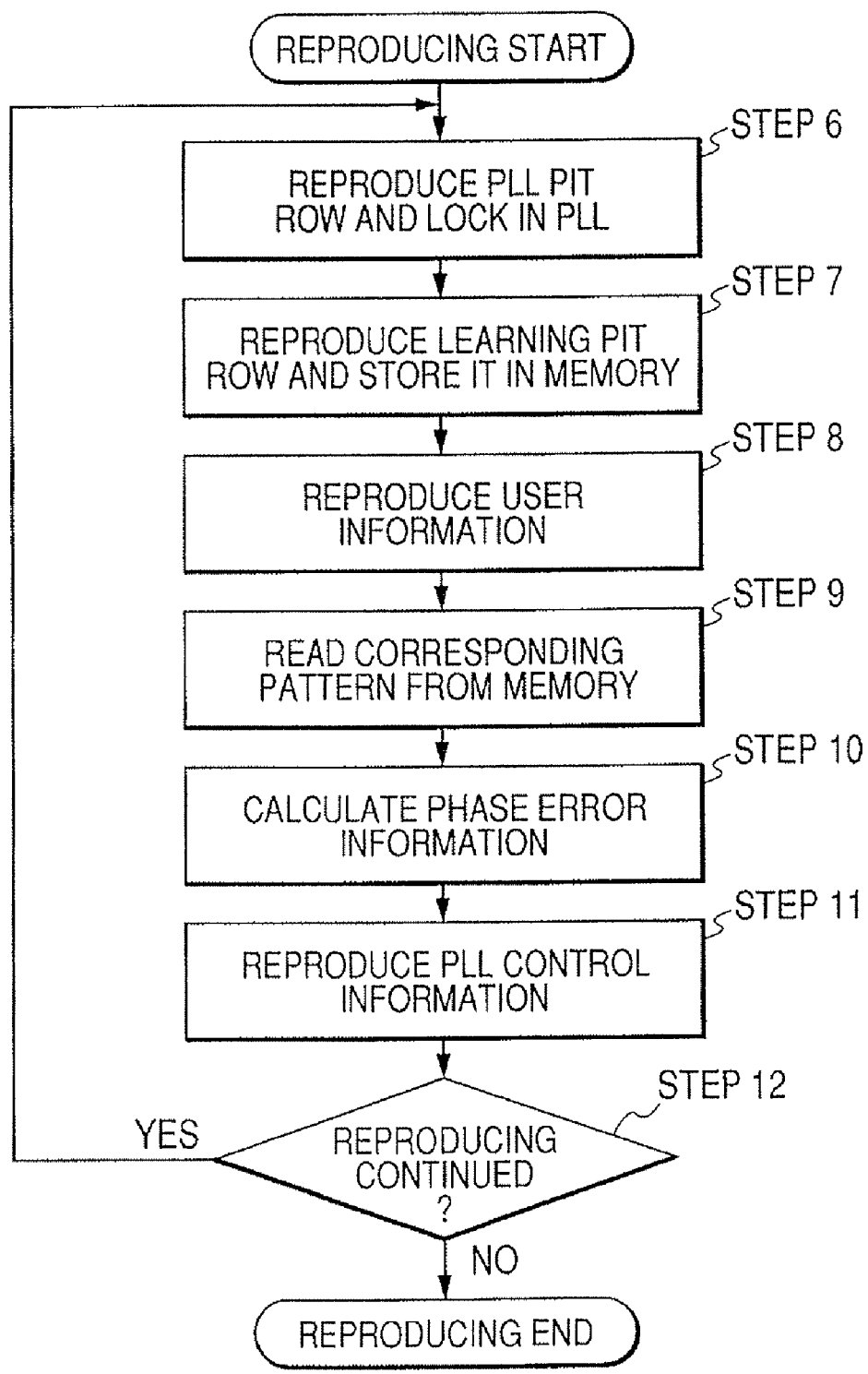
FIG. 19 is a flow chart for describing the information-reproducing steps of an optical information recording/reproducing device according to the present invention.
Figure 20:
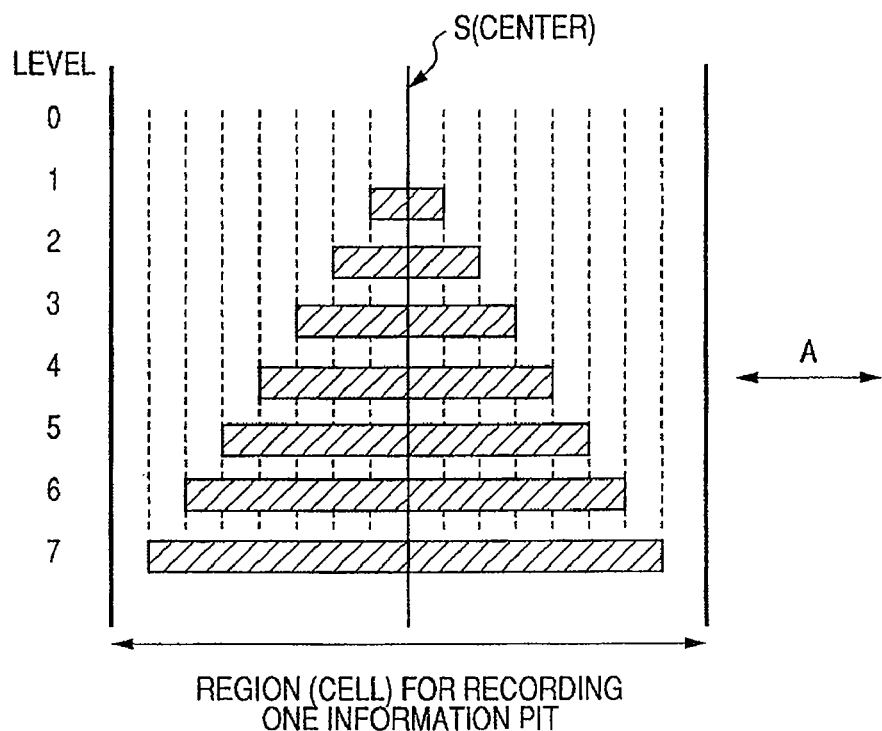
FIG. 20 is a view for describing a width of a conventional multivalued information pit in a track direction according to a difference of levels.
Figure 21:
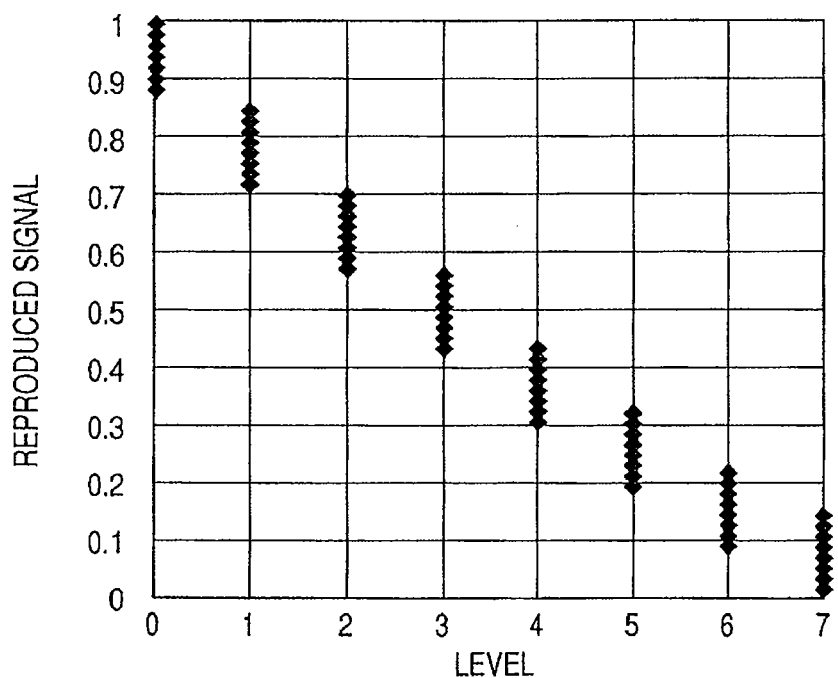
FIG. 21 is a view for describing a conventional amplitude distribution of a cell center value.
Figure 22:
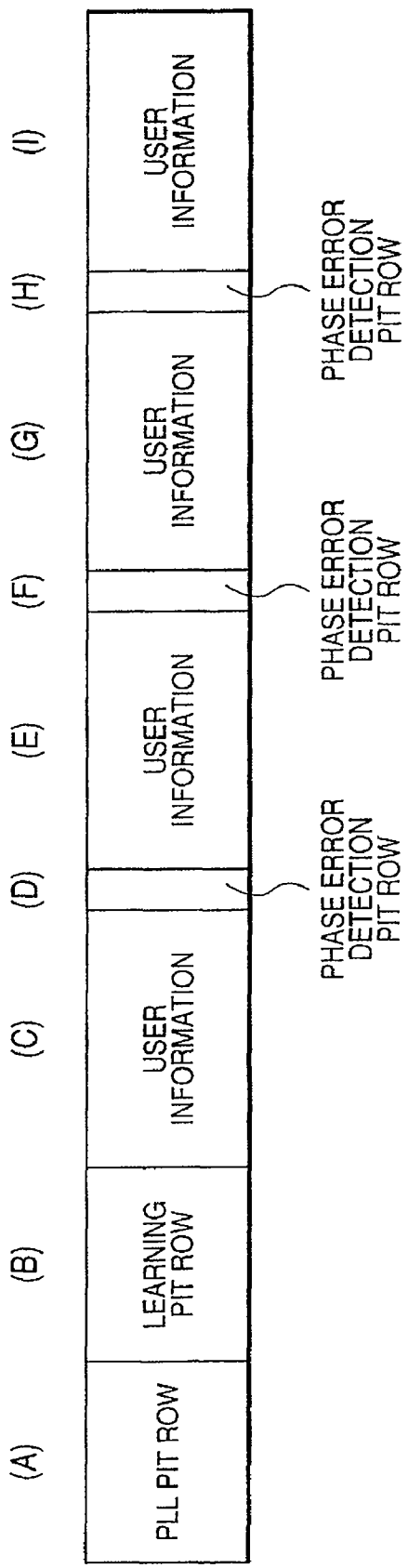

Next, a recording operation will now be described with reference to flow charts in FIGS. 18 and 19. When recording information, an optical information recording/reproducing device 1 in FIG. 1 starts the recording operation when having received a command to record the information.

At first, the device produces a pit row (A) to be used in lock-in for PLL when starting recording (step 1). Here, the pit row (A) to be used in lock-in for PLL can be the pit row, which can obtain a frequency and phase error information by conventional binarization and can operate PLL.

For instance, the pit row (A) may be a pit row regardless of a recorded information row, in which the whole cell includes a repeated unit of a cell having a pit and a cell having no pit, or further, in which the whole cell includes two cells having a pit and two cells having no pit, so as to obtain a reproduced signal with a higher signal-to-noise ratio. Furthermore, a combination of them may be considered.

Next, the device produces a learning pit row (B) of a multivalued information row, namely, adds recorded data subsequently to the lock-in pit row for PLL, as illustrated in FIG. 17 (step 2). A pattern of the learning pit row needs to be formed of a combination of at least one (N×M×N) pattern in the first unit and the fourth unit, at least one (M×M) pattern in the second unit, and at least one (M×M×M) pattern in the third unit, in consideration of a combination of a center value of cells in front and back of the learning pit row.

Subsequently, the device converts the sent information, for instance, into eight levels for every three bits (in which the information is subjected to modulation, the addition to an error correcting code, and the like), as illustrated in FIG. 2, produces a recorded information row (C) illustrated in FIG. 17, and adds it as the recorded information row (step 3).

Then, the device receives a recorded information row produced as described above, and records multivalued information on a target track on an optical disk 4, which is an optical information medium, by using the recorded pulse row corresponding to each multiple value level and by using an optical head 5 (step 4). The device repeats the above-described steps 1 to 4 while the information is recorded, and finishes the recording operation when all the information recording operations are finished (step 5).

Subsequently, reproducing multivalued information recorded in the above way will be described with reference to FIG. 19. In recent years, a method of forming address information in an optical disk by wobbling a guide groove of an information track and obtaining the address information when reproducing the guide groove had become mainstream. The technique adopted in many cases does not need to directly add the address information to the recording information. FIG. 19 describes the case of reproducing an optical disk which has address information formed therein by the wobbling technique, as an example.

When an optical information recording/reproducing device 1 receives a command to reproduce information, the device 1 starts a reproducing operation. In the operation, the device 1 reproduces address information from the wobbled information formed in the information track as described above, and searches the target track in an optical disk 4. At first, the device 1 starts the reproduction of a PLL lock-in region (A) in the head of an information recording unit in FIG. 17 by using an optical head 5, and produces a reproduction clock synchronized with a cell length (step 6).

Next, the device 1 reproduces a learning pit row while using a reproduction lock synchronized with a recorded cell. The learning pit row has each own pattern recorded according to the first unit, the second unit, the third unit or the fourth unit, as described above. The device 1 samples a cell center value or an intercell value of a reproduced signal according to the corresponding unit, and stores it in a memory (step 7).

For instance, when using a first unit, the device 1 samples each cell center value, because of having a recorded pattern of (N×M×N) recorded in a learning pit, as described above. The device 1 subsequently forms, for instance, an approximated curve by using each cell center value as described above, and calculates a gradient of reproduced signals by using a gradient of a tangent line in the center of a middle M-value cell. The ideal value of the center value in the cell is the center value of the cell recorded by using the M-value, which is in the middle of the learning pit row. The gradient of reproduced signals and the ideal value of the cell center value are stored in a memory (step 7). As a matter of course, the gradient of the reproduced signals may be calculated with a method other than the above method, which has been previously described.

In addition, when employing the fourth unit, the device 1 determines an ideal value of a center value in an M-value cell and stores it in a memory, similar to the case of the first unit. But, when employing the fourth unit, the device 1 does not need to determine a gradient of reproduced signals.

On the other hand, when using a second unit or a third unit, the device 1 similarly reproduces a corresponding recorded pattern and detects a cell center value or an intercell value, then, similarly calculates a gradient of a reproduced signal with the use of the above-described method, and stores the obtained gradient of a reproduced signal and the ideal value of the cell center value or the ideal value of the intercell value, in a memory.

In the above step, the reproduction clock does not need to be phase-controlled in particular by using a PLL lock-in pit row so as to maintain a synchronized state with a reproduced signal. The phase error information is set at "zero" after the PLL lock-in a pit row has been reproduced, and the PLL state is maintained. Thereby, adequate phase accuracy is obtained.

The device 1 starts the reproduction of recorded information from reproduced signals on the basis of the learned result, as described above (step 8). Individual descriptions of a method of reproducing the recorded information will be omitted, because of not being directly related to the present invention. In the above step, it is important to keep and to control a reproduction clock into a synchronized state with reproduced signals at all times, in order to precisely obtain the recorded information. For that purpose, it is necessary to obtain information on the phase error between the reproduction clock and the reproduced signal, as described above.

Next, the device 1 reads out a gradient of the reproduced signal, an ideal value of a cell center value or the ideal value of the intercell value, which has been obtained by learning in step 7, from the memory (step 9). As a matter of course, the gradient of the reproduced signal, the ideal value of the cell center value or the ideal value of the intercell value is read-out in correspondence with a first unit to fourth unit.

Next, the device 1 calculates the information on the phase error while being reproduced between the reproduced signal and the clock by using the gradient of the reproduced signal, the ideal value of the cell center value or the ideal value of the intercell value, which has been read out from the memory, and the cell center value and the intercell value in real reproduced signals obtained while being reproduced (step 10). A detailed description of a method of calculating the phase error will be omitted, because it has been previously described in detail, in items of the first unit to the fourth unit.

In the above step, the device 1 having employed any of the first unit to the fourth unit, as described above, also temporarily stops extracting the phase error.

The device 1 carries out a PLL control on the basis of the phase error information to produce the reproduction clock (step 11). A PLL circuit does not need a special specification, but has only to optimize characteristics so as to correspond to a frequency band of a reproduced signal. Accordingly, a detailed description will be omitted. The device 1 continues directly extracting the phase error from the reproduced signals and producing the synchronous clock while reproducing information.

The device 1 further repeats the above-described operation in each unit of a series of information recording rows (A), (B) and (C) in FIG. 17 to reproduce information, and when having received a command that the reproduction has been completed, ends the reproducing operation (step 12). The device 1 can reproduce information through these operations without arranging a pit row for phase error information.

As described above, the device 1 can detect the phase error information for producing a reproduction clock directly from a reproduced signal of the recorded information, accordingly, eliminates the need of a special region for PLL on a recording medium, and can enhance the efficiency of recording the information onto the recording medium (format efficiency).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An optical information reproducing method of reproducing multivalued information recorded on a track of an optical information medium having a recording/reproducing region, which has virtual cells arranged thereon at regular spacings, the multivalued information being recorded thereon by changing a length of an information pit in a track direction or an area of the information pit in a cell with the use of a light spot, and the multivalued information being reproduced by detecting the level of a multistage reproduced signal from the information pit, the method comprising:

sampling a reproduced signal in the multivalued information recorded in one cell with an M-value (M<N), which is arranged at each of the plurality of cells recorded with an N-value (N≦3) on the track, and detecting a cell center value; and obtaining a phase error for producing a reproduction clock on the basis of the detected cell center value, a previously derived ideal value of the cell center value, and a previously derived gradient of the reproduced signal in the vicinity of the ideal value of the cell center value.

2. An optical information reproducing method according to claim 1, further comprising obtaining the phase error on the basis of:

(i) a gradient that is obtained from at least two cell center values sandwiching the ideal value of the cell center value, which is obtained by reproducing a multivalued learning region formed of information pits for learning, which are recorded in the optical information medium; and (ii) a difference between the ideal value of the cell center value and the detected cell center value.

* * * * *